(12) United States Patent
Sim et al.

(10) Patent No.: US 8,495,198 B2
(45) Date of Patent: *Jul. 23, 2013

(54) NETWORK RESOURCE MONITORING AND MEASUREMENT SYSTEM AND METHOD

(75) Inventors: Lim Or Sim, Victoria (AU); Yee Han Cheong, Victoria (AU); Andrew Lawrence Jarrett, Victoria (AU); Shefik Bey, Victoria (AU); Anthony Roger Eustace, Victoria (AU); Matthew James Petit, Victoria (AU)

(73) Assignee: Comscore, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/329,199

(22) Filed: Dec. 16, 2011
(Under 37 CFR 1.47)

(65) Prior Publication Data

US 2012/0158959 A1    Jun. 21, 2012

Related U.S. Application Data

(63) Continuation of application No. 13/098,358, filed on Apr. 29, 2011, now Pat. No. 8,112,511, which is a continuation of application No. 12/780,890, filed on May 15, 2010, now Pat. No. 7,953,839, which is a continuation of application No. 12/100,685, filed on Apr. 10, 2008, now abandoned, which is a continuation of application No. 09/763,338, filed as application No. PCT/AU00/00937 on Aug. 7, 2000, now Pat. No. 7,376,722.

(30) Foreign Application Priority Data

Aug. 6, 1999 (AU) .................................. PQ2063

(51) Int. Cl.
*G06F 15/173* (2006.01)

(52) U.S. Cl.
USPC ............. 709/223; 709/224; 709/225; 726/10; 725/9; 725/10; 725/11; 370/352

(58) Field of Classification Search
USPC ................. 709/223, 224, 225; 726/10; 725/9, 725/10, 11; 370/352
See application file for complete search history.

(56) References Cited

U.S. PATENT DOCUMENTS

| | | | |
|---|---|---|---|
| 3,540,003 A | 11/1970 | Murphy | |
| 3,696,297 A | 10/1972 | Otero | |

(Continued)

FOREIGN PATENT DOCUMENTS

| | | |
|---|---|---|
| EP | 228242 | 8/1987 |
| EP | 451384 | 4/1990 |

(Continued)

OTHER PUBLICATIONS

Arlit et al., *Internet Web Servers: Workload Characterization and Performance Implications*, IEEE/ACM Transactions on Networking, vol. 5, No. 5, Oct. 1997, 15 pages.

(Continued)

*Primary Examiner* — Thuong Nguyen
(74) *Attorney, Agent, or Firm* — MH2 Technology Law Group, LLP

(57) ABSTRACT

A method and system for analyzing and measuring multiple sources of data over a communications network (18) so as to ascertain information or usage of one or more resources, such as resource servers (2). A data collection and processing means (20) collects and processes the data sources which are forwarded to a reporting server (34) as a combined data source made available to interested parties.

18 Claims, 10 Drawing Sheets

U.S. PATENT DOCUMENTS

| | | |
|---|---|---|
| 3,818,458 A | 6/1974 | Deese |
| 3,906,454 A | 9/1975 | Martin |
| 4,058,829 A | 11/1977 | Thompson |
| 4,125,892 A | 11/1978 | Fukuda et al. |
| 4,166,290 A | 8/1979 | Furtman et al. |
| 4,236,209 A | 11/1980 | Lombardo, Jr. et al. |
| 4,283,709 A | 8/1981 | Lucero et al. |
| 4,355,372 A | 10/1982 | Johnson et al. |
| 4,356,545 A | 10/1982 | West |
| 4,473,824 A | 9/1984 | Claytor |
| 4,516,216 A | 5/1985 | Armstrong |
| 4,546,382 A | 10/1985 | McKenna et al. |
| 4,566,030 A | 1/1986 | Nickerson et al. |
| 4,603,232 A | 7/1986 | Kurland et al. |
| 4,658,290 A | 4/1987 | McKenna et al. |
| 4,677,552 A | 6/1987 | Sibley |
| 4,695,880 A | 9/1987 | Johnson et al. |
| 4,700,378 A | 10/1987 | Brown |
| 4,706,121 A | 11/1987 | Young |
| 4,713,791 A | 12/1987 | Saluski |
| 4,718,025 A | 1/1988 | Minor et al. |
| 4,725,886 A | 2/1988 | Galumbeck et al. |
| 4,740,912 A | 4/1988 | Whitaker |
| 4,745,559 A | 5/1988 | Willis et al. |
| 4,751,578 A | 6/1988 | Reiter et al. |
| 4,757,456 A | 7/1988 | Benghiat |
| 4,774,658 A | 9/1988 | Lewin |
| 4,783,648 A | 11/1988 | Homma et al. |
| 4,792,921 A | 12/1988 | Corwin |
| 4,817,080 A | 3/1989 | Soha |
| 4,823,290 A | 4/1989 | Fasack et al. |
| 4,831,582 A | 5/1989 | Miller et al. |
| 4,845,658 A | 7/1989 | Gifford |
| 4,849,879 A | 7/1989 | Chinnaswamy et al. |
| 4,868,866 A | 9/1989 | Williams, Jr. |
| 4,887,308 A | 12/1989 | Dutton |
| 4,907,188 A | 3/1990 | Suzuki |
| 4,912,466 A | 3/1990 | Call |
| 4,912,522 A | 3/1990 | Oates et al. |
| 4,924,488 A | 5/1990 | Kosich |
| 4,935,870 A | 6/1990 | Burk, Jr. et al. |
| 4,954,699 A | 9/1990 | Coffey et al. |
| 4,958,284 A | 9/1990 | Bishop et al. |
| 4,961,132 A | 10/1990 | Uehara |
| 4,972,367 A | 11/1990 | Burke |
| 4,972,504 A | 11/1990 | Daniel, Jr. et al. |
| 4,977,455 A | 12/1990 | Young |
| 4,977,594 A | 12/1990 | Shear |
| 4,989,230 A | 1/1991 | Gillig et al. |
| 5,006,978 A | 4/1991 | Neches |
| 5,007,017 A | 4/1991 | Kobayashi |
| 5,008,929 A | 4/1991 | Olsen et al. |
| 5,019,963 A | 5/1991 | Alderson et al. |
| 5,023,907 A | 6/1991 | Johnson et al. |
| 5,023,929 A | 6/1991 | Call |
| 5,038,211 A | 8/1991 | Hallenbeck |
| 5,038,374 A | 8/1991 | Kaufman et al. |
| 5,042,027 A | 8/1991 | Takase et al. |
| 5,047,867 A | 9/1991 | Strubbe et al. |
| 5,049,873 A | 9/1991 | Robins et al. |
| 5,062,147 A | 10/1991 | Pickett et al. |
| 5,063,610 A | 11/1991 | Alwadish |
| 5,088,108 A | 2/1992 | Uddenfeldt et al. |
| 5,101,402 A | 3/1992 | Chiu et al. |
| 5,109,350 A | 4/1992 | Henwood et al. |
| 5,140,419 A | 8/1992 | Galumbeck et al. |
| 5,150,116 A | 9/1992 | West |
| 5,159,685 A | 10/1992 | Kung |
| 5,161,109 A | 11/1992 | Keating et al. |
| 5,166,866 A | 11/1992 | Kim et al. |
| 5,181,113 A | 1/1993 | Chang |
| 5,204,947 A | 4/1993 | Bernstein et al. |
| 5,208,588 A | 5/1993 | Nishiyama |
| 5,210,530 A | 5/1993 | Kammerer et al. |
| 5,212,684 A | 5/1993 | MacNamee et al. |
| 5,214,792 A | 5/1993 | Alwadish |
| 5,220,522 A | 6/1993 | Wilson et al. |
| 5,220,655 A | 6/1993 | Tsutsui |
| 5,223,827 A | 6/1993 | Bell et al. |
| 5,223,924 A | 6/1993 | Strubbe |
| 5,226,120 A | 7/1993 | Brown et al. |
| 5,231,593 A | 7/1993 | Notess |
| 5,235,680 A | 8/1993 | Bijnagte |
| 5,237,677 A | 8/1993 | Hirosawa et al. |
| 5,237,681 A | 8/1993 | Kagan et al. |
| 5,237,684 A | 8/1993 | Record et al. |
| 5,239,540 A | 8/1993 | Rovira et al. |
| 5,241,625 A | 8/1993 | Epard et al. |
| 5,241,671 A | 8/1993 | Reed et al. |
| 5,245,429 A | 9/1993 | Virginio et al. |
| 5,247,517 A | 9/1993 | Ross et al. |
| 5,247,575 A | 9/1993 | Sprague et al. |
| 5,247,697 A | 9/1993 | Ban |
| 5,249,260 A | 9/1993 | Nigawara et al. |
| 5,253,346 A | 10/1993 | Okabayashi et al. |
| 5,260,878 A | 11/1993 | Luppy |
| 5,262,860 A | 11/1993 | Fitzpatrick et al. |
| 5,267,314 A | 11/1993 | Stambler |
| 5,267,351 A | 11/1993 | Reber et al. |
| 5,276,458 A | 1/1994 | Sawdon |
| 5,276,789 A | 1/1994 | Besaw et al. |
| 5,281,962 A | 1/1994 | Vanden Heuvel et al. |
| 5,283,639 A | 2/1994 | Esch et al. |
| 5,287,363 A | 2/1994 | Wolf et al. |
| 5,297,249 A | 3/1994 | Bernstein et al. |
| 5,301,350 A | 4/1994 | Rogan et al. |
| 5,309,243 A | 5/1994 | Tsai |
| 5,315,093 A | 5/1994 | Stewart |
| 5,315,580 A | 5/1994 | Phaal |
| 5,317,140 A | 5/1994 | Dunthorn |
| 5,321,831 A | 6/1994 | Hirose |
| 5,321,838 A | 6/1994 | Hensley et al. |
| 5,327,237 A | 7/1994 | Gerdes et al. |
| 5,327,554 A | 7/1994 | Palazzi, III et al. |
| 5,331,544 A | 7/1994 | Lu et al. |
| 5,333,302 A | 7/1994 | Hensley et al. |
| 5,339,239 A | 8/1994 | Manabe et al. |
| 5,339,412 A | 8/1994 | Fueki |
| 5,347,632 A | 9/1994 | Filepp et al. |
| 5,349,662 A | 9/1994 | Johnson et al. |
| 5,351,278 A | 9/1994 | Koshishiba et al. |
| 5,351,293 A | 9/1994 | Michener et al. |
| 5,355,327 A | 10/1994 | Stent et al. |
| 5,355,484 A | 10/1994 | Record et al. |
| 5,359,367 A | 10/1994 | Stockill |
| 5,361,359 A | 11/1994 | Tajalli et al. |
| 5,367,677 A | 11/1994 | Stanfill |
| 5,371,846 A | 12/1994 | Bates |
| 5,374,951 A | 12/1994 | Welsh |
| 5,375,070 A | 12/1994 | Hershey et al. |
| 5,379,380 A | 1/1995 | Mori et al. |
| 5,388,211 A | 2/1995 | Hornbuckle |
| 5,388,252 A | 2/1995 | Dreste et al. |
| 5,388,258 A | 2/1995 | Larsson et al. |
| 5,390,281 A | 2/1995 | Luciw et al. |
| 5,398,336 A | 3/1995 | Tantry et al. |
| 5,406,269 A | 4/1995 | Baran |
| 5,408,607 A | 4/1995 | Nishikawa et al. |
| 5,410,598 A | 4/1995 | Shear |
| 5,412,778 A | 5/1995 | Andres |
| 5,414,809 A | 5/1995 | Hogan et al. |
| 5,418,728 A | 5/1995 | Yada |
| 5,461,708 A | 10/1995 | Kahn |
| 5,483,658 A | 1/1996 | Grube et al. |
| 5,485,897 A | 1/1996 | Matsumoto et al. |
| 5,490,060 A | 2/1996 | Malec |
| 5,491,820 A | 2/1996 | Belove et al. |
| 5,495,581 A | 2/1996 | Tsai |
| 5,499,340 A | 3/1996 | Barritz |
| 5,524,073 A | 6/1996 | Stambler |
| 5,555,303 A | 9/1996 | Stambler |
| 5,557,333 A | 9/1996 | Jungo et al. |
| 5,560,038 A | 9/1996 | Haddock |
| 5,568,471 A | 10/1996 | Hershey et al. |
| 5,572,643 A | 11/1996 | Judson |
| 5,594,911 A | 1/1997 | Cruz et al. |
| 5,604,867 A | 2/1997 | Harwood |

| | | |
|---|---|---|
| 5,615,264 A | 3/1997 | Kazmierczak et al. |
| 5,623,652 A | 4/1997 | Vora et al. |
| 5,634,100 A | 5/1997 | Capps |
| 5,646,998 A | 7/1997 | Stambler |
| 5,648,965 A | 7/1997 | Thadani et al. |
| 5,671,283 A | 9/1997 | Michener et al. |
| 5,673,382 A | 9/1997 | Cannon et al. |
| 5,696,702 A | 12/1997 | Skinner et al. |
| 5,706,502 A | 1/1998 | Foley et al. |
| 5,708,709 A | 1/1998 | Rose |
| 5,708,780 A | 1/1998 | Levergood et al. |
| 5,710,915 A | 1/1998 | McElhiney |
| 5,710,918 A | 1/1998 | Lagarde et al. |
| 5,712,979 A | 1/1998 | Graber et al. |
| 5,715,453 A | 2/1998 | Stewart |
| 5,717,860 A | 2/1998 | Graber et al. |
| 5,717,923 A | 2/1998 | Dedrick |
| 5,724,521 A | 3/1998 | Dedrick |
| 5,732,218 A | 3/1998 | Bland et al. |
| 5,737,619 A | 4/1998 | Judson |
| 5,740,549 A | 4/1998 | Reilly et al. |
| 5,787,253 A | 7/1998 | McCreery et al. |
| 5,793,302 A | 8/1998 | Stambler |
| 5,796,952 A | 8/1998 | Davis et al. |
| 5,799,292 A | 8/1998 | Hekmatpour |
| 5,819,156 A | 10/1998 | Belmont |
| 5,819,285 A | 10/1998 | Damico et al. |
| 5,823,879 A | 10/1998 | Goldberg et al. |
| 5,829,001 A | 10/1998 | Li et al. |
| 5,835,923 A | 11/1998 | Shibata et al. |
| 5,838,919 A | 11/1998 | Schwaller et al. |
| 5,848,396 A | 12/1998 | Gerace |
| 5,870,546 A | 2/1999 | Kirsch |
| 5,878,384 A | 3/1999 | Johnson et al. |
| 5,892,917 A | 4/1999 | Myerson |
| 5,926,168 A | 7/1999 | Fan |
| 5,931,912 A | 8/1999 | Wu et al. |
| 5,933,811 A | 8/1999 | Angles et al. |
| 5,935,207 A | 8/1999 | Logue et al. |
| 5,936,541 A | 8/1999 | Stambler |
| 5,948,061 A | 9/1999 | Merriman et al. |
| 5,951,643 A | 9/1999 | Shelton et al. |
| 5,956,483 A | 9/1999 | Grate et al. |
| 5,958,010 A | 9/1999 | Agarwal et al. |
| 5,963,914 A | 10/1999 | Skinner et al. |
| 5,964,839 A | 10/1999 | Johnson et al. |
| 5,974,148 A | 10/1999 | Stambler |
| 5,982,917 A | 11/1999 | Clarke et al. |
| 5,986,653 A | 11/1999 | Phathayakorn et al. |
| 5,999,178 A | 12/1999 | Hwang et al. |
| 6,014,638 A | 1/2000 | Burge et al. |
| 6,018,619 A | 1/2000 | Allard et al. |
| 6,052,730 A | 4/2000 | Felciano et al. |
| 6,070,145 A | 5/2000 | Pinsley et al. |
| 6,078,324 A | 6/2000 | Phathayakorn et al. |
| 6,108,637 A | 8/2000 | Blumenau |
| 6,112,238 A | 8/2000 | Boyd et al. |
| 6,112,240 A | 8/2000 | Pogue et al. |
| 6,115,608 A | 9/2000 | Duran et al. |
| 6,115,742 A | 9/2000 | Franklin et al. |
| 6,138,155 A | 10/2000 | Davis et al. |
| 6,167,358 A | 12/2000 | Othmer et al. |
| 6,173,311 B1 | 1/2001 | Hassett et al. |
| 6,185,586 B1 | 2/2001 | Judson |
| 6,250,930 B1 | 6/2001 | Mintz |
| 6,264,560 B1 | 7/2001 | Goldberg et al. |
| 6,275,854 B1 | 8/2001 | Himmel et al. |
| 6,278,966 B1 | 8/2001 | Howard et al. |
| 6,279,036 B1 | 8/2001 | Himmel et al. |
| 6,279,112 B1 | 8/2001 | O'Toole, Jr. et al. |
| 6,317,787 B1 | 11/2001 | Boyd et al. |
| 6,324,546 B1 | 11/2001 | Ka et al. |
| 6,360,261 B1 | 3/2002 | Boyd et al. |
| 6,393,479 B1 | 5/2002 | Glommen et al. |
| 6,397,359 B1 | 5/2002 | Chandra et al. |
| 6,408,335 B1 | 6/2002 | Schwaller et al. |
| 6,418,470 B2 | 7/2002 | Blumenau |
| 6,434,532 B2 | 8/2002 | Goldband et al. |
| 6,449,604 B1 | 9/2002 | Hansen et al. |
| 6,457,025 B2 | 9/2002 | Judson |
| 6,466,970 B1 | 10/2002 | Lee et al. |
| 6,473,407 B1 | 10/2002 | Ditmer et al. |
| 6,569,095 B2 | 5/2003 | Eggers |
| 6,601,100 B2 | 7/2003 | Lee et al. |
| 6,609,239 B1 | 8/2003 | Xavier |
| 6,621,881 B2 | 9/2003 | Srinivasan |
| 6,625,648 B1 | 9/2003 | Schwaller et al. |
| 6,662,195 B1 | 12/2003 | Langseth et al. |
| 6,662,227 B2 | 12/2003 | Boyd et al. |
| 6,671,715 B1 | 12/2003 | Langseth et al. |
| 6,712,702 B2 | 3/2004 | Goldberg et al. |
| 6,719,660 B2 | 4/2004 | Palazzolo |
| 6,766,370 B2 | 7/2004 | Glommen et al. |
| 6,807,558 B1 | 10/2004 | Hassett et al. |
| 6,842,782 B1* | 1/2005 | Malik et al. ............... 709/224 |
| 6,859,833 B2 | 2/2005 | Kirsch et al. |
| 7,017,143 B1 | 3/2006 | Andrew et al. |
| 7,376,722 B1* | 5/2008 | Sim et al. ................. 709/223 |
| 2002/0040394 A1 | 4/2002 | Shapira |
| 2002/0040395 A1 | 4/2002 | Davis et al. |
| 2002/0042823 A1* | 4/2002 | DeBettencourt et al. ...... 709/224 |
| 2002/0077787 A1 | 6/2002 | Rappaport et al. |
| 2002/0078191 A1 | 6/2002 | Lorenz |
| 2002/0099812 A1 | 7/2002 | Davis et al. |
| 2002/0099818 A1 | 7/2002 | Russell et al. |
| 2002/0099819 A1 | 7/2002 | Hattori et al. |
| 2002/0103664 A1 | 8/2002 | Olsson et al. |
| 2002/0112048 A1 | 8/2002 | Gruyer et al. |
| 2002/0161673 A1 | 10/2002 | Lee et al. |
| 2003/0046303 A1 | 3/2003 | Chen et al. |
| 2003/0046385 A1 | 3/2003 | Vincent |
| 2003/0062223 A1 | 4/2003 | Coyle et al. |
| 2003/0110485 A1* | 6/2003 | Lu et al. ........................ 725/9 |
| 2003/0144868 A1 | 7/2003 | MacIntyre et al. |
| 2003/0163563 A1 | 8/2003 | Bean |
| 2003/0187677 A1 | 10/2003 | Malireddy et al. |
| 2003/0208578 A1 | 11/2003 | Taraborelli et al. |
| 2003/0231203 A1 | 12/2003 | Gallella |
| 2004/0221033 A1 | 11/2004 | Davis et al. |
| 2005/0114511 A1 | 5/2005 | Davis et al. |
| 2008/0263200 A1* | 10/2008 | Or Sim et al. ................. 709/224 |
| 2011/0004682 A1 | 1/2011 | Honnold et al. |

FOREIGN PATENT DOCUMENTS

| | | |
|---|---|---|
| EP | 388658 | 9/1990 |
| EP | 632382 | 6/1993 |
| EP | 747841 | 12/1996 |
| EP | 228458 | 10/1997 |
| EP | 228458 | 6/2001 |
| JP | 09-2882275 | 10/1997 |
| JP | 10-124428 | 5/1998 |
| JP | 63-100581 | 5/1998 |
| JP | 10-224349 | 8/1998 |
| JP | 11-110321 | 4/1999 |
| JP | 2003-506790 | 2/2003 |
| WO | WO 98/26529 | 6/1998 |

OTHER PUBLICATIONS

Bertot et al., *Web Usage Statistics: Measurement Issues and Analytical Techniques*, Government Information Quarterly, vol. 14, No. 4, 1997, pp. 373-395.

Montgomery, *Using Clickstream Data to Predict WWW Usage*, Aug. 1999, 27 pages.

Naor et al., *Secure Accounting and Auditing on the Web*, Computer Networks and ISDN Systems 30, 1998, pp. 541-550.

Padmanabhan et al., *Analysis of Web Site Usage Data: How Much Can We Learn About the Consumer from Web Logfiles?*, Working Paper IS-96-18, Dec. 1996, 33 pages.

Shahabi et al., *Knowledge Discovery from Users Web-Page Navigation*, 1997, 11 pages.

Zaiane et al., *Discovering Web access patterns and trends by applying OLAP and data mining technology on Web logs*, Research and Technology Advances in Digital Libraries, Apr. 1998, 12 pages.

Cooley et al., *Data Preparation for Mining World Wide Web Browsing Patterns*, 1999, 27 pages.

Cooper, *Design Considerations in Instrumenting and Monitoring Web-Based Information Retrieval Systems*, Journal of the American Society for Information Science. 49(10):903-919, 1998.

Covella et al., *Self-Similarity in World Wide Web Browsing Patterns*, 1999, 27 pages.

Mulvenna et al., "*The 'Soft-Push': Mining Internet Data for Marketing Intelligence*", 1997, 12 pages.

Powell, *Tomorrow's Heavyweight?*, Network World, vol. 15, No. 49, Dec. 7, 1998, 1 page.

Seshan et al., *Spand: Shared Passive Network Performance Discovery*, Dec. 1997, 13 pages.

Watt, *Management tools get with the Web*, Network World, vol. 14, No. 25, Jun. 23, 1997, 1 page.

Wilson, Bryan, "*OPERA"=Index DOT Html/Css by Brain Wilson=*, retrieved from http://www.blooberry.com/indexot/history/opera.htm, printed on May 24, 2006, pp. 1-3.

Beckett, David, *Combines Log System*, [1] Computing Laboratory, retrieved from http://www.igd.fhg.de/archive/1995.sub.--www95/papers/46/comblog.html, printed on May 24, 2006, pp. 1-8.

Mayer-Schonberger, Viktor, *The Internet and Privacy Legislation: Cookies for a Treat?*, retrieved from http://web.archive.org/web/1990203034203/www.wvjolt.wvu.edu/wjolt/current-/issue1/articlaes/mayer/..., printed on May 24, 2006, pp. 1-7.

Boyan, Juston A., *Anonymous surfing "The Anonymizer Home Page"*, 1995, retrieved from http://web.archive.org/web/1990208003332rm.sub.--1/anonymizer.cs.cmu.edu- :8080/, printed on May 24, 2006, p. 1.

O'Connell, Gerald M., *Advertising on The World Wide Web is a Whole New Ball Game*, Modern Media, 1995, retrieved from http://web.archive.org/web/19961111095728/www.modemmedia.com/clippings/ar- ticles/ne ..., printed on Jun. 8, 2005, pp. 1-8.

Nardone, John, *The Modem Media Internet Research and Involvement Scale (IRIS)*, Modem Media, 1995, retrieved on http://web.archive.org/web/19961111095728/www.modemmedia.com/clippings/ar- ticles/iris ..., printed on Jun. 8, 2005, pp. 1-3.

Houston, John, "A Vision of Advertising Technology—How It Will Work ...", Modem Media, 1994, retrieved from http://web.archive.org/web/19961111095728/www.modemmedia.com/clippings/ar- ticles/sm ..., printed on Jun. 8, 2005, pp. 1-6.

Author Unknown, *Screen Shots of Windows NT 3:1*, retrieved from http://www.cs.umd.edu/hcil/musiseum/systems/winnt31src.html, printed on Jun. 7, 2005, pp. 1-4.

Johnson, Aaron, *Implementation Guide, HBX On Demand Web Analytics*, WebSideStory Inc., 2006, pp. 1-15.

Johnson, Aaron, *Screen Shots of HBX Oon Demand Web Analytics*, WebSideStory Inc., 2006, pp. 1-10.

Bank, Joseph A., *Java Security*, retrieved from http://net.ai.mit.edu/.about.jbank/javapaper/javapaper.html, 1995, pp. 1-11.

Lynnworth, Ann, *Tracking Home Page Hits*, Dr. Dobbs articles (1995), retrieved from http://www.ddj.com/documents/s=979/0ddj9517d/, printed on Jul. 14, 2005, pp. 1-11.

Author Unknown, *1996 e-mail counter logs*, Counter, pp. 1-23.

Becker, Wolf-Jurgen, *Engineering Measurement*, Department of Engineering Measurement, UNI Kassel, FB16, Last Modified Sep. 20, 1996, p. 1.

Author Unknown, *Google search "access counters"*, retrieved from http://groups.google.com/group/comp.infosystems.www.authoring.html/browse- .sub.--thread/dfb1 a837f2ge165e/aOeOe6a131c61 02d?q=acces ..., printed May 24, 2006, pp. 1-3.

Author Unknown, *Logging Control in W3C httpd, generic statistics programs that analyze log file contents*, retrieved from http://www.w3.org/Daemon/User/Config/Logging.html, printed on May 24, 2006, pp. 1-3.

Author Unknown, *Netscape History, Mar. 1993 through Mar. 17, 2006*, retrieved from http://www.holgermetger.de/Netscape.sub.--Histry.html, printed on May 24, 2006, pp. 1-4.

Author Unknown, *Applets and Applications*, Department of Engineering Measurement, retrieved from http://web.archive.org/web/19970802020436/http://www..uni-kassel.de/fb16/- ipm/mt/javae/html, printed on May 24, 2006, last modification 1996, pp. 1-5.

Dean, Drew et al., *Security Flaws in the HotJava Web Browser* Dept. of Computer Science, Princeton University, 1997, pp. 1-8.

Bank, Joseph A., *Java Security*, retrieved from http://swissnet.ai.mit.edu/about/jbank/javapaper/javapaper.html, 1995, pp. 1-11.

Weston, Scott, *Netscape 2.0b2 allows for invasion of privacy*, retrieved from http://www.tbtf.com/resource/b2-privacy-bug.html, printed on May 24, 2006, 1995, pp. 1-2.

Author Unknown, *Classic HTTP Documents*, retrieved from http://www.w3.org/Protcols/Calssic.html, printed on May 24, 2006, 1995, p. 1.

Author Unknown, *Google search "javascript"*, retrieved from http://groups.google.com/group/comp.society.privacr/browse.sub.13thread/thread/9b12496aeda7fd78/dd2ebe5f8966fd05?q=javascript&mum=1&hl ..., printed on May 24, 2006, pp. 1-3.

Author Unknown, *Extended Log File Format W3C Working Draft WD-logfile-960323*, retrieved from http://www.w3.org/TR/WD-logfile.html, printed on May 24, 2006, pp. 1-6.

Author Unknown, *Computer Privacy Digest Moderator*, Computer Privacy Digest V8#024 (1996), retrieved from http://web.archive.org/web/20000829051834/itu.rdg.ac.uk/misc/Mailing.sub.- --Lists/cpd/00000002.htm, printed on May 24, 2006, pp. 1-19.

Author Unknown, *Google search "javascript exploit"* http://groups.google.com/group/comp.sys.mac.misc/browse.sub.thread/thread/f9285c7d4e4354cd/eb94d50669810159?q=javascript+exp;oit &mum ..., printed on May 24, 2006, pp. 1-3.

Author Unknown, *Order Counter.html history, Order History of Changes*, retrieved from http://www.ualberta.ca/GEO/Counter.History.html, printed on May 24, 2006, pp. 1-8.

Author Unknown, *A Little History of the Word Wide Web (1945-1995)*, retrieved from http://www..w3.org/History.html, printed on May 24, 2006, pp. 1-6.

Author Unknown, *Information Operations Timeline, 1200BC through 2003*, retrieved from http://www.jfsc.ndu.edu/schools.sub.programs/jciws/iw/io.sub.timeline.asp, printed on May 24, 2006, pp. 1-9.

Berners-Lee, Tim, *Information Management: A Proposal*, CERN (Mar. 1989 and May 1990), retrieved from http://www.w3.org.History/1989.proposal.html, printed on May 24, 2006, pp. 1-14.

Author Unknown, *Google search "xferstats"*, retrieved from http://groups.google.com/group/alt.sources/browse.sub.thread/thread/c9e60d434be3ad86/0a180fb213f27e2b?q=xferstats&mum=199 &hl=en, printed on May 24, 2006, pp. 1-10.

Berners-Lee, Tim, *WorldWideWeb: Proposal for a HyperText Project*, e-mail from T. Berners-Lee/CN, R. Cailliau/ECP to P.G. Innocenti/ECP, G. Kellner/ECP, D.O. Williams/CN, Nov. 12, 1990, pp. 1-7.

Author Unknown, *WorldWideWeb for C5, Presentation (1991)*, retrieved from http://www.w3.org/Talks/C5.sub.--17.sub.--May.sub.--91.html, p. 1.

Author Unknown, *Change History for httpd, History List*, retrieved from http://www.w3.org/Daemon/Features.html, printed on May 24, 2006, pp. 1-15.

Author Unknown, *WWW Talk 1991 Archives Messages from Oct. 28, 1991 through Dec. 13, 1991*, retrieved from http://ksi.cpsu.ucalgary.ca/archives/WWW-TALK/www-talk-12991.index.html, printed on May 24, 2006, p. 1.

CERN Computer News Letter (Oct. through Dec. 1991), Ref: CERN-CNL-1991-204, vol. XXVI, Issue No. 3., retrieved from http://ref.web.cern.ch/ref/CERN/CNL/1991/204/, printed on May 24, 2006, pp. 1-2.

Author Unknown, *HyperText Transfer Protocol Design Issues (1991), Design Decision*, retrieved from http://www.w3.org/Protocols/DesignIssues.html, printed on May 24, 2006, pp. 1-3.

Author Unknown, *An updated quick look at ViolaWWW, Review*, retrieved from http://www..w3.org/History/19921103-hypertext/hypertext/Viola/Review.html- , printed on May 24, 2006, pp. 1-2.

Author Unknown, *Demos*, retrieved from http://www.w3.ord/Conferences/JENC92/Demonstrations.html, printed on May 24, 2006, p. 1.

Author Unknown, *The World Wide Web Project*, http://www.w3.org/History/19921103-hypertext/hypertext/WWW/TheProject.htm- I, printed on May 24, 2006, p. 1.

Author Unknown, *World-Wide Web Servers, W3 Servers*, retrieved from http://www.w3.org/History/19921103-hypertext/hypertext/DataSources/WWW/Se- rvices.html, printed on May 24, 2006, pp. 1-2.

Author Unknown, *Basic HTTP as defines in 1992, HTTP: A protocol for networked information*, retrieved from http://www.w3.org/Protocols/HTTP/HTTP2.html, printed on May 24, 2006, pp. 1-2.

Author Unknown, *An Early History of Lynx: Multidimensional Collaboration*, retrieved from http://people.cc.ku.edu/.about.grobe/early-lynx.html, printed May 24, 2006, pp. 1-8.

Author Unknown, *World-Wide Web, Presentation of WWW to Online Publishing 93*, retrieved from http://www.w3.org/Talks/OnlinePublishing93/Overview.html, printed on May 24, 2006, p. 1.

Thompson, John, *Commercialization of the Internet, Creation of the NSFnet*, retrieved from http://johnthomson.org/j561/NSFcreate-4.html, printed on May 24, 2006, pp. 1-2.

Thompson, John, *Commercialization of the Internet, The beginning of commercialization of the NSFnet*, retrieved from http://johnthomson.org/j561/NSFcomm-5.html, printed on May 24, 2006, p. 1.

Thompson, John, *Commercialization of the Internet, Criticism of the NSFnet grows*, retrieved from http://johnthomson.org/j561/NSF.criticism-6.html, printed on May 24, 2006, p. 1.

Thompson, John,*Commercialization of the Internet, The NSFnet starts to change their policy*, retrieved from http://johnthomson.org/j561/NSFpolicy-7html, printed on May 24, 2006, p. 1.

Thompson, John, *Commercialization of the Internet, Changes in NSF policy become law—The Internet is Commercialized*, http://johnthomson.org/j561/NSFlaw-9.html, printed on May 24, 2006, pp. 1-2.

Author Unknown, *Browser History Timeline: Overview, Browser Timelines*, retrieved from http://blooberry.com/indexdot/history/browsers6.htm, printed on May 24, 2006, pp. 1-3.

Author Unknown, EmailMsg<9306182231.AA03641@austin.BSDI.com>, *lexus log file summaries*, retrieved from http://ksi.cpsu.ucalgary.ca/archives/WWW-TALK/www-talk-1993q2.messages/56- 3.html, printed on May 24, 2006, pp. 1-4.

Author Unknown, *WB Project-assorted design notes, Working Notes*, retrieved from http://www.w3.org/History/1994/WWW/WorkingNotes/Overview.html, printed on May 24, 2006, pp. 1-2.

Author Unknown, *Google search "fwgstat", Looking for a GN log*, retrieved from http://groups.google.com/group/comp.infosystems.gopher/browse.sub.--thread/thread/15dc16c0284c02d0/953bf38f2ceel5ea?q=fwgstat&mum=34 . . . , printed on May 24, 2006, pp. 1-3.

Author Unknown, *Google search "fwgstat", Single program to summarize logs of several kinds of severs*, retrieved from http://groups.google.com/group/comp.infosystems.gopher/browse.sub.--thread/thread/4790232128a9157/d1534978ddddf998?q=fwgstat&mum=33 . . . , printed on May 24 2006, pp. 1-10.

Author Unknown, *Google search "getsites" Announcing getsites 1.5, a web log analyzer*, http://groups.google.com/group/comp.infosystems.gopher/browse.sub.--thread/thread/a36eeb6daea735d8/0fa7adf53e51b894?q=getsites&mum-=19&h . . . , printed on May 24, 2006, pp. 1-2.

Author Unknown, *Google search "wwwstat", Announcing wwwstat-0.1—an access log summary program*, retrieved from http://groups.google.com/group/comp.infosystems.gopher/browse.su- b.--thread/thread/784aa9c20470d342/fc0cde0742990875?q=wwwstat&mum=43 . . . , printed on May 24, 2006, pp. 1-8.

Author Unknown, *Google search wusage 1.0), WUSAGE 1.0: Server Usage Graphs, Top Ten. . .* , http//groups.google.com/group/comp.infosystems.gopher/browse.sub.--thread/thread/a07834d8b38dbc4f/f05bf1df25d47fd3?q=wusage+1.0&mum=1 . . . , printed on May 24, 2006, pp. 1-2.

Author Unknown, *Google search "getstats" Announcing getsites 1.0, a web log analyzer*, retrieved from http://groups.google.com/group/comp.infosystems.gopher/browse.sub.--threa-d/thread/1009159de1aaf6aa/ed924b219923cc7d?q=getstats&mum=1&h 1 . . . , printed on May 24, 2006, pp. 1-3.

Author Unknown, *First International Conference on the World-Wide Web*, (May 25-27, 1994) CERN, retrieved from http://www94.web.cern.ch/WWW94/, printed on May 24, 2006, pp. 1-2.

Berners-Lee, Tim, *Plenary talk by Tim Berners-Lee at WWWF94:Overview*, Plenary at WWW Geneva 94, , http://www.w3/org/Talks/WWW94Tim/, printed on May 24, 2006, pp. 1-4.

Author Unknown, *Mosaic Communications Changes Name to "Netscape Communications Corporation"*, Communications News Release, retrieved from http://www.holgermetzger.de/netdcape/NetscapeCommunicationsNewsRelease.ht- m, printed on May 24, 2006, pp. 1-2.

Author Unknown, *Google search "cgi hit counter", WWW hit counter: does this work?*, retrieved from http://groups.google.com/group/comp.infosystems.gopher/browse.sub.--threa-d/thread/b4ef428d8c96d525/3e18b779b1dad79e?qcgi+hit+couonter&mum=74& . . . , printed on May 24, 2006, pp. 1-7.

Author Unknown, *Welcome to Netscape, Getting Started*, retrieved from http://hnehostng.com/mirrors/Origin.sub.--of.sub.--a.sub.--Browser/mcom.1- 0.1994/home/welcome.html, printed on May 24, 2006, pp. 1-2.

Author Unknown, *ibiblio-history, prehistory through 2002*, retrieved from http://www.ibiblio.org/history/, printed on May 24, 2006, pp. 1-11.

Author Unknown, *Google search "cgi hit counter", Hit counter*, retrieved from http://groups.google.com/group/comp.infosystems.gopher/browse.sub.--thread/thread/390dc231bb3f0097/64bddc80086f124b?q=cgi+hit+counte . . . , printed on May 24, 2006, pp. 1-2.

Author Unknown, *The Third International World-Wide Web Conference, Technology, Tools and Applications*, (Apr. 10-14, 1995), Darmstadt, Germany, retrieved from http://www.igd.fhg.de/archive/1995.sub.--www95/, printed on May 24, 2006, p. 1.

Author Unknown, *WWW Homepage Access Counter and Clock!*, retrieved from http://www.muquit.com/muquit/software/Count/Count.html, printed on May 24, 2006, pp. 1-32.

Author Unknown, *Javapage, JAVA*, retrieved from http:/web.archive.org/web/20040712072256/http://www.groton.k12.ct.us/WWW/-fsr/student/Spring02/W . . . , printed on May 24, 2006, pp. 1-4.

Author Unknown, *Google search "hit counter", Access Counters. . .* , retrieved from http://groups.google.com/group/comp.infosystems.authoring.html/browse.sub- .--thread/thread/e515dad2e5d1e8cc/Oebdc329e9ec00cc?q=hit+c . . . , printed on May 24, 2006, pp. 1-7.

Author Unknown, *CGI: Common Gateway Interface*, retrieved from http://www.w3.org/CGI/, printed on May 24, 2006, pp. 1-2.

Author Unknown, *Computers and the Internet, Webpage counters*, retrieved from http://www.earthstation9.com/counters.htm, printed on May 24, 2006, pp. 1-2.

Author Unknown, *Windows based only on internet BBS software—The official BBS FAQ*, retrieved from http://www.sysopworld.com/bbsfaq/ch02.2.4.htm, printed on May 24, 2006, pp. 1-23.

Author Unknown, *Crazy Counter, GIF89a Version*, source unknown, Jan. 31, 1996, pp. 1-2.

Author Unknown, *Crazy Counter (GIF89a) animated*, source unknown, Mar. 8, 1996, p. 1.

Author Unknown, *Crazycounter.java*, source unknown, 1996, pp. 1-5.

Author Unknown, *Horace's Java, Page View Timer Demo, Form 1, Page View Timer Applet*, source unknown, 1994, pp. 1-2.

Author Unknown, *Hello Net! Counter0*, source unknown, p. 1, date unknown.

Author Unknown, *JavaWorld*, retrieved from http://www.javaworld.com, last updated Apr. 1, 1996, p. 1.

Author Unknown, *Java World editorial calendar*, source unknown,1996, pp. 1-2.

Author Unknown, *JavaWorld*, retrieved from http://www.javaworld.com, last updated Mar. 8, 1996, p. 1.

Author Unknown, *Sun and Netscape Announce Javascript*, Javascript Announcement.txt, Dec. 4, 1995, pp. 1-8.

Lamers, Yermo, *Webthreads Announcement.txt*, source unknown, Oct. 8, 1996, pp. 1-5.

McGraw, Gary, Ph.d., et al., *Untangling the Woven Web: Testing Web-based Software*, source unknown, 1996, pp. 1-8.

Author Unknown, *A visual history of web measurement: Vendor emergence, Technology Deployment and Seminal Events*, Jun. 2005, p. 1.

Author Unknown, *Applet Demos*, Sep. 30, 1995-Nov. 22, 1995 form. java: 1 class, 4kByte, source unknown, pp. 1-2, date unknown.
Author Unknown, *Counter*, retrieved from java@mt.e-technik.uni-kassel.de, p. 1, date unknown.
Author Unknown, *Applet Collection*, Ticker, pp. 1-5, date unknown.
Author Unknown, *Applet Kollektion*, Ticker, pp. 1-5, date unknown.
Tapley, Rebecca et al., *The Official Gamelan Java Directory*, EarthWeb, pp. 1-6, date unknown.
Girdley, Michael et al., *Web Programming with JAVA*, 1996, 9 pages including cover, index and pp. 365-370.
Barber, Paul, *Redacted Email from Paul Barber* dated May 3, 1996, source unknown, May 3, 1996, pp. 1-2.
Author Unknown, *Computer Networks and ISDN Systems*, Proceedings of the Third International World-Wide Web Conference, Darmstadt, Germany, The International Journal of Computer Band Telecommunications Networking, 1995, pp. 1-10.
Author Unknown, *A publication of Baker Library*, Harvard Business School (1995), vol. 2, No. 5, retrieved from http://members.verizon.net/.about.vze2vjb4/tw/tw2.sub.--5.txt, printed May 3, 2006, pp. 1-11.
Author Unknown, *Google search "Java applet web monitoring", InfoTicker Java Applet*, retrieved from http://groups.google.com/group/comp/infosystems.www.announce/browse.sub.--thread/thread/cc . . . , printed May 2, 2006, pp. 1-2.
Author Unknown, *ftp.ist.utl.pt screen shots of index of/pub/ftp/utilities/fwgstat,wwwstat*, source unknown, pp. 1-3, date unknown.
Author Unknown, *Google search "Java applet hit counter" Can u make a hit counter in a Java applet?*, retrieved from http://groups.google.com/group/comp.lang.java/browse.sub.--threa-d/threadf2a41d0cb5c8eee4/c8 . . . , printed on May 2, 2006, pp. 1-6.
Author Unknown, *Google Groups: Michael Rapp (1196) Counter*, retrieved from http://groups-beta.google.com/group/comp.lang.javascript/browse.sub.--thread/thread/487a9f9c . . . , printed on Jun. 8, 2005, pp. 1-4.
Neumann, Peter G., Moderator, *Forum on Risks to the Public in Computers and Related Systems*, ACM Committee on Computers and Public Policy, vol. 17, Issue 79, 1996, 11 pages.
Kamba, Tomonari et al., *The Krakatoa Chronicle—An Interactive, Personalized, Newspaper on the Web*, source unknown, 15 pages, date unknown.
Author Unknown, *Harris Computer Systems and Webster Network Strategies Announce Alliance to Offer WWW Monitoring Capabilities Through Firewalls*, Business Wire, HighBeam Research, Mar. 4, 1996, pp. 1-5.
Author Unknown, *Network Traffic Management, Database Traffic Management*, Resonate, 2005, 2 pages.
Author Unknown, *Google Groups: comp.infosystems.www.authoring.html "access counters search"*, retrieved from http://groups.google.com/group/comp.infosystems.www.authoring.html-/browse.sub.--thread/thread.dfb1a837f29e165e/a0e0e6a131c6102d?q=acces . . . , pp. 1-3, date unknown.
Author Unknown, file://P:\P Drive Files\Clients\Nielsen-Netratings\Settled Cases\Sane Solutions, LLC\. . . , retrieved from file://P:\P Drive Files\Clients\Nielsen-Netratings\Settled Cases\Sane Solutions, LLC\. . . , printed on Dec. 21, 2006, pp. 1-2.
McGrath, Richard A., *The Tail-less Mouse*, Computer Graphics World, vol. 11, Oct. 1998, 5 pages including pp. 117-118.
Pallab, Paul, *Marketing on the Internet*, Journal of Consumer Marketing, vol. 13 (4), Aug. 1996, pp. 27-39.
Lobow, Martha K., *An Engineer's Guide to Autocad*, Industrial Engineering, vol. 19, Aug. 1997, 5 pages.
Dellecave, Tom, Jr., *The Net Effect*, Sales and Marketing Management, Mar. 1996, 9 pages.
Zillmer, Sharon, *How to Make Your Web Ads Pay Off*, vol. 101 (23), Jun. 1996, 4 pages.
Author Unknown, *PC-Meter Tracks Computer Uses*, Advertising Age, Oct. 2, 1995, 4 pages.
Cove, J.F. et al., *Online Text Retrieval Via BrowsinG*, Information Processing and Management, vol. 24, No. 1, 1988, pp. 31-37.
Caramel, E. et al., *Browsing in Hypertext: A Congnitive Study*, IEEE Transactions on Systems, Man, and Cybernetics, vol. 22, No. 5, 1992, pp. 865-883.

Marchionni, G., *Information Seeking Strategies*, Journal of the American Society for Information Science, vol. 10 (1), 1989, pp. 54-66.
Author Unknown, *Google Groups*: comp.unix.xenix (Google search for xferstats), retrieved from http://groups.google.com/group/comp.unix.xenix/browse.sub.—thread/thread/cb3d1aed21bc0e3e/8d9ce54693af9e98?q=xferstats&mum=200... printed on May 24, 2006, pp. 1-3, date unknown.
Berners-Lee, Tim, *The World Wide Web Browser*, retrieved from http://www.w3.org/People/Berners-Lee/WorldWideWeb.html, printed on May 24, 2006, pp. 1-2, date unknown.
Author Unknown, *Yahoo! Search, Web programming>Access Counters in the Yahool Directory*, retrieved from http://dir.yahoo.com/Computers.sub.—and.sub.—Internet/Internet/World.sub.-b.—Wide.sub.—Web/Programming/Access.sub.—Counters/, printed on May 24, 2006, pp. 1-3.
Image of Compact Disc, *Unica Corporation, Documents Responsive to NetRatings, Inc. v. WebSideStory Inc.* Subpoena, Civil Action No. 06-CV-878 (LTS) (AJP), Videotaped Deposition of Gregory Doench dated Jun. 26, 2006, pp. 1.
Image of Compact Disc, *Unica Corporation, Documents Responsive to NetRatings, Inc. v. WebSideStory Inc.* Subpoena, Civil Action No. 06-CV-878 (LTS) (AJP), pp. 1, date unknown.
Author Unknown, *The Role of IP Intelligence in the Online World*, NetAcuity IP Intelligence Whitepaper, Digital Envoy, pp. 1-10, date unknown.
Catledge, Lara D. et al. *Characterizing Browsing Strategies in the World Wide Web*, The Third International WWW Conference, pp. 1-9, date unknown.
Cunha, Carlos R. et al., *Characteristics of WWW Client Based Traces*, Computer Science Department, Boston University, 1995, pp. 1-18.
Staten, James, *Navigator Tricks Raise Concerns*, MacWeek, vol. 10, No. 11, 1996, pp. 18(2).
Greenberg, Saul, *Using Unix: Collected Traces of 168 Users*, Advanced Technologies, The Alberta Research Council, pp. 1-13, date unknown.
Hilbert, David M. et al., *Agents for Collecting Application Usage Data Over The Internet*, Department of Information and Computer Science, University of California, 9 pages, date unknown.
Desjardins, Louis, *Activity Monitor 1.1, User's Guide*, source unknown, 1995, 5 pages.
Pitkow, James E. et al., *Results From the Third WWW User Survey*, Graphics, Visualization & Usability (GVU) Center, pp. 1-10, date unknown.
Polier, Ariel, *Improving WWW Marketing Through User Information and Non-Intrusive Communications*, Internet Profiles Corporation, PC Data Inc., pp. 1-4, date unknown.
Fuller, Rodney et al., *Measuring User Motivation From Server Log Files*, PC Data Inc., retrieved from http://www.microsoft.com/usability/webconf/fuller/fuller.htm, 2004, pp. 2-16.
Crovella, Mark E. et al., *Explaining World Wide Web Traffic Self-Similarity*, Computer Science Department, Boston University, Technical Report, 1995, pp. 1-19.
Kraut, Robert et al., *Homenet: A Field Trial of Residential Internet Services*, The HomeNet Project, retrieved from http://homenet.hcii.cs.cmu.edu/progress/report1.html, 1995, pp. 1-12.
Kraut, Robert et al., *HomeNet: A Field Trial of Residential Internet Services*, retrieved from http://www.acm.org/sigchi/chi96/proceedings/papers/kraut/rek.sub.—txt.ht-m, pp. 1-14, date unknown.
Siochi, Antonio C. et al., *Computer Analysis of User Interfaces Based on Repetition in Transcripts of User Session*, ACM Transactions on Information System, vol. 9, No. 4, 1991, pp. 309-335.
Perlman, Gary, *Asynchronous Design/Evaluation Methods for Hypertext Technology Development*, Department of Computer and Information Science, Hypertext 89 Proceedings, 1989, pp. 62-81.
Bieber, Michael et al., *Backtracking in a Multiple-Window Hypertext Environment*, Institute for Integrated Systems Research, ECHT 1994 Proceedings, 1994, pp. 158-166.
McKenzie, Bruce et al., *An Empirical Analysis of Web Page Revisitation*, Department of Computer Science, University of Canterbury, 7 pages, date unknown.
Author Unknown, *Using Norton pcANYWHERE for DOCS*, Symantec Corporation, 1994, 30 pages.

Knoblaugh, Rick, *IOMON—Protected mode I/O port monitor*, Programmer's Journal, vol. 9 No. 5, 1991, 6 pages.
Abrams, Michael A., *A Tool to Aid in Model Development and Validation*, Systems Engineering—Retail Division, NCR Corporation, Annual Simulation Symposium, pp. 1-10, date unknown.
Lee, Joseph K.W. et al., *Intelligent Agents for Matching Information Providers and Consumers on the World-Wide-Web*, Department of Computer Science, The University of Hong Kong, 1997, 11 pages.
Feliciano, Ramon M. et al., *Lamprey: Tracking Users on the World Wide Web*, Section on Medical Informatics, Stanford University, 5 pages, date unknown.
Editors, *They Could Be Monitoring Your Every Web Move*, GCN Apr. 29, 1996 issue, retrieved from http://www.gcn.com, pp. 1-3.
Wu, Sun et al., *Virtual Proxy Servers for WWW and Intelligent Agents on the Internet*, Department of Computer Science and Engineering National Chung Cheng University, IEEE, 1997, pp. 1-10.
Johnson, Andrew et al., *Automatic Touring in a Hypertext System*, Wayne State University, Computer Science Department, IEEE, 1993, pp. 524-530.
Toole, John E., *Performance Measurement and Evaluation of Online Information Systems*, ACM Computer Science Conference-Agenda for Computing Research: The Challenge for Creativity, 1985, pp. 196-203.
Gile, Scott A., *Reporting Application Usage in a LAN Environment*, ACM, 1990, pp. 147-159.
Author Unknown, *NCSA Mosaic Histor—In the beginning there was NCSA Mosaic*, retrieved from htttp//:www.ncsa.uiuc.edu/news/mosaichistory/, 1993, pp. 1-15.
Mogul, Jeffrey C., *Efficient Use of Workstations for Passive Monitoring of Local Area Networks*, WRL Research Report 90/5, 1990, 32 pages.
Shepard, Timothy Jason, *TCP Packet Trace Analysis*, Massachusetts Institute of Technology, Laboratory of Computer Science, 1991, pp. 1-68.
Anderson, Debra et al., *Next Generation Intrusion Detection Expert System (NIDES) Software Users Manual, Beta Update Release*, SRI International, 1991, pp. 1-301.
Bamshad, Mobasher, *Transaction Identification, Next: Discovery Techniques on Up: Preprocessing Tasks Previous: Data Cleaning*, retrieved from http://maya.cs.edpaul.edu/.about.mobasher/webminer/survey/node12.html, 1997, pp. 1-2.
Bamshad, Mobasher, Discovery Techniques in Web Transactions, Next: Path Analysis Up: Pattern Discovery from Previous: Transaction Identification, retrieved from http://maya.cs.edpaul.edu/.about.mobasher/webminer/survey/node13.html, 1997, pp. 1.
Bamshad, Mobasher, *Path Analysis: Next: Association Rules Up: Discovery Techniques on Previous: Discovery Techniques*, retrieved from http://maya.cs.edpaul.edu/.about.mobasher/webminer/survey/node14.html, 1997, pp. 1.
Bamshad, Mobasher, Association Rules, Next: Sequential Patterns Up: Discovery Techniques on Previous: Path Analysis, retrieved from http://maya.cs.edpaul.edu/.about.mobasher/webminer/survey/node15.html, 1997, pp. 1.
Bamshad, Mobasher, *Sequential Patterns, Next: Clustering and Classification Up: Discovery Techniques on Previous: Association Rules*, retrieved from http://maya.cs.edpaul.edu/.about.mobasher/webminer/survey/node16.html, 1997, pp. 1.
Bamshad, Mobasher, *Clustering and Classification, Next: Analysis of Discovered Up: Discovery Techniques on Previous: Sequential Patterns*, retrieved from http://maya.cs.edpaul.edu/.about.mobasher/webminer/survey/node17.html, 1997, pp. 1.
Bamshad, Mobasher, *Analysis of Discovered Patterns, Next: Visualization Techniques Up: Web Mining: Information and Previous: Clustering and Classification*, retrieved from http://maya.cs.edpaul.edu/.about.mobasher/webminer/survey/node18.html, 1997, pp. 1.
Bamshad, Mobasher, *Visualization Techniques, Next OLAP: Techniques Up: Analysis of Discovered Previous: Analysis of Discovered*, retrieved from http://maya.cs.edpaul.edu/.about.mobasher/webminer/survey/node19.html, pp. 1.
Bamshad, Mobasher, *OLAP Techniques, Next: Data and Knowledge Up: Analysis of Discovered Previous: Visualization Techniques*, retrieved from http://maya.cs.edpaul.edu/.about.mobasher/webminer/survey/node20.html, 1997, pp. 1.
Bamshad, Mobasher, *Data and Knowledge Querying, Next: Usability Analysis Up: Analysis of Discovered Previous: OLAP Techniques*, retrieved from http://maya.cs.edpaul.edu/.about.mobasher/webminer/survey/node21.html, 1997, pp. 1.
Bamshad, Mobasher, *Usability Analysis, Next: Web Usage Mining Up: Analysis of Discovered Previous: Data and Knowledge*, retrieved from http://maya.cs.edpaul.edu/.about.mobasher/webminer/survey/node22.html, 1997, pp. 1.
Bamshad, Mobasher, *Web Usage Mining Architecture, Next: Research Directions Up: Web Mining: Information and Previous: Usability Analysis*, retrieved from http://maya.cs.edpaul.edu/.about.mobasher/webminer/survey/node23.html, 1997, pp. 1-3.
Bamshad, Mobasher, *Research Directions, Next: Data Pre-Processing for, Up: Web Mining: Information and Previous: Web Usage Mining*, retrieved from http://maya.cs.edpaul.edu/.about.mobasher/webminer/survey/node24.html, 1997, pp. 1.
Bamshad, Mobasher, *Data Pre-Processing, Next: The Mining Process Up: Research Directions, Previous: Research Directions*, retrieved from http://maya.cs.edpaul.edu/.about.mobasher/webminer/survey/node25.html, 1997, pp. 1.
Bamshad, Mobasher, *The Mining Process, Next: Analysis of Mined Up: Research Directions, Previous: Data Pre-Processing*, retrieved from http://maya.cs.edpaul.edu/.about.mobasher/webminer/survey/node26.html, 1997, pp. 1.
Bamshad, Mobasher, *Analysis of Mined Knowledge, Next: Conclusion Up: Research Directions, Previous: The Mining Process*, retrieved from http://maya.cs.edpaul.edu/.about.mobasher/webminer/survey/node27.html, 1997, pp. 1.
Bamshad, Mobasher, *Conclusion, Next: References Up: Web Mining: Information and Previous: Analysis of Mined*, retrieved from http://maya.cs.edpaul.edu/.about.mobasher/webminer/survey/node29.html, 1997, pp. 1.
Bamshad, Mobasher, *References, Next: About this Document Up: Web Mining: Information and Previous: Conclusion*, retrieved from http://maya.cs.edpaul.edu/.about.mobasher/webminer/survey/node29.html, 1997, pp. 1-6.
Bamshad, Mobasher, *About This Document . . . , Up: Web Mining: Information and Previous: References*, retrieved from http://maya.cs.edpaul.edu/.about.mobasher/webminer/survey/node30.html, 1997, pp. 1.
Fielding, Roy, *wwwstat: HTTPd Logfile Analysis Software*, Department of Information and Computer Science, University of California, retrieved from http://ftp.ics.uci.edu/pub/websoft/wwwstat/, 2001, pp. 1-3.
Author Unknown, *Changes to wwwstat: HTTPd Logfile Analysis Package*, retrieved from http://ftp.ics.uci.edu/pub/websoft/wwwstat/changes, pp. 1-4, date unknown.
Author Unknown, *wwwstat manual, wwwstat—summarize WWW server (httpd) access statistics*, retrieved from http://ftp.ics.uci.edu/pub/websoft/wwwstat/wwwstat.html, pp. 1-11, date unknown.
Author Unknown, *tcpslice(8): extract pieces of/glue together . . . —Linux man page*, retrieved from htttp://www.die.net/doc/linux/man/man8/tcpslice.8.html, pp. 1-3, date unknown.
Author Unknown, *tcpslice-Linux Command-Unix Command, Focus on Linux*, retrieved from http://linux.about.com/library/cmd/blcmdl8.sub.--tcpslicxe.htm, pp. 1-3, date unknown.
Weiler, Paul et al., *Usability Lab Tools: One Year Later*, CHI 94, Celebrating Independence, Conference Companion, 1994, p. 33.
Cunha, Carlos R. et al., *Characteristics of WWW Client-Based Traces*, Computer Science Department, Boston University, 1995, pp. 1-18.
Lynnworth, Ann, *Tracking Home Page Hits, Reporting on user access*, Dr. Dobb's Software Tools for the PRofessional Programmer, retrieved from http://ddj.com/docuemnts/s=979/ddj9517d/, 1995, pp. 1-11.
Becker, Wofl-Jurgen, *Uni Kassel, FB16*, Messtechnik Hompepage, Fachgebeit Mebtechnik, p. 1, date unknown.
Author Unknown, *Applets at Kassel, Applets and Applications*, Department of Engineering Measurement, pp. 1-5, date unknown.
Author Unknown, *Applets in Kassel, Applets and Applikationen*, Fachgebeit MeBtechnik, pp. 1-5, date unknown.
Author Unknown, *Applet Demos*, source unknown, pp. 1-22, date unknown.

Author Unknown, *Counter*, source unknown, pp. 1-18, date unknown.
Author Unknown, *Java Enhanced Communication Tools*, Gamelan Earthweb, pp. 1-7, date unknown.
Wandschneider, Marc, *ActiveX Controls Framework: Sample Code for Authoring Non-MFC Controls*, Microsoft Corporation, (updated Apr. 1996), retrieved from http://msdn.microsoft.com/archive/en-us/dnaractivex/html/msdn.sub.--cntrl- fmk.asp?frame=true. pp. 1-15.
Author Unknown, *Google search for Garrett Casey: Google Groups: comp.infosystems.www.authoring.cgi*, Google.com, pp. 1-2, date unknown.
Author Unknown, *Google search for Garrett Casey Counter: Counter Service for WWW pages; Google groups: misc.entrepreneurs*, Google.com, pp. 13, date unknown.
Raggett, Dave, *W3C Recommendation*, HTML 3.2 Reference Specification, retrieved from http://www.w3.org/TR/REC-html32, Jan. 14, 1997, pp. 1-49.
Berners-Lee, Tim et al., *Nypertext Transfer Protocol—HTTP/1.0*, Network Working Group, 1996, retrieved from http://www.w3.org/Protocols/rfc1945/rfc1945, pp. 1-57.
Kamba, Tomonari, *The Krakatoa chronicle—An Interactive, Personalized, Newspaper on the web*, source unknown, 15 pages, date unknown.
McGee, Michael, *Web pages: A Programmer's Perspective*, retrieved from http://www.dfpug.com/loseblattsammlung/migration/whitepapers/webpages.html, 1996, pp. 1-13.
Author Unknown, *Hot Java Read Me and link to the software on SunSITE*, SunSITE, Software Information and Technology Exchange retrieved from http://www,ibiblio.org/hotjava/, printed on May 24, 2006, 5 pages.
Berners-Lee, Tim, *Build a Web Site*, source unknown, 1995, 9 pages.
December, John et al., *HTML and CGI Unleashed*, source unknown, 1995, 3 pages.
Shishir Gindavaram (1996) "CGI Programming on the World Wide Web".
Girdley, Michael et al., *Web Programming with Java*, source unknown, 1996, 4 pages.
Davis, Owen et al., *Instant JAVA Applets*, source unknown, 1996, 6 pages.
Pew, Jon A., *Instant JAVA*, source unknown, 1996, 40 pages.
Naughton, Patrick, *JAVA Handbook: The Authoritative Guide to the Java Revolutionary*, source unknown, 1996, 97 pages.
Kent, Peter et al., *Official Netscape JavaScript Book*, source unknown, 1996, 316 pages.
Rodley, John, *Writing JAVA Applets*, source unknown, 1996, 24 pages.
Abrams, Marc et al., *Multimedia Traffic Analysis Using CHITRA95*, ACM Multimedia 95—Electronic Proceedings, 1995, pp. 1-17.
McCanne, Steven et al., *The BSD Packet Filter: A New Architecture for User-Level Packet Capture*, Lawrence Berkeley Laboratory, 1992, pp. 1-11.
Hansen, Stephen E. et al., *Automated System Monitoring and Notification with Swatch*, LISA, 1993, pp. 145-152.
Author Unknown, *tcpdump-dump traffic on a network*, retrieved from http://www.tcpdump.org/tcpdump.sub.--man.hml, printed on Jun. 12, 2006, pp. 1-26.
Author Unknown,*Gwstat v1.1—generate graphs of httpd server traffic, public release 1994*, retrieved from http://www.bubl.ac.uk///archive/internet/www/servers/hwstat6.htm, printed on Jun. 12, 2006, 1 page.
Blythe, Garrett et al., *Lynx Users Guide Version 2.3*, retrieved from http://www.cse.unsw.edu.au/help/doc/lynx/lynx.sub.--help/lynx.sub.--users- .sub.--guide.html, pp. 1-12, date unknown.
Finke, Jon, *Monitoring Usage of Workstations with a Relational Database*, LISA, 1994, pp. 149-158.
Author Unknown, *RealServer Administration and Content Creation Guide Version 4*, Progressive Networks, Inc.,1997, 366 pages.
Author Unknown, *RealAudio Server Administration and Content Creation Guide Version 3*, Progressive Networks, Inc., 1996, 286 pages.
Pitkow, James E. et al., *Using the Web as a Survey Tool: Results from the Second WWW User Survey*, Graphics, Visualization & Usability Center, College of Computing Georgia Institute of Technology, 1994, pp. 1-12.
Chen et al., *Supporting Advertisement on Electronic Publications*, IBM Technical Disclosure Bulletin, 1996, pp. 149-150.
Author Unknown, *Audience Tracking System for Electronic Newspapers*, Telegrafix Communications Inc., Tracking Web Advertising, 1995, 3 pages.
Author Unknown, *Study Faults Online Ads for Kids, FTC Probes*, Rueters, Tracking Web Advertising, 1996, 3 pages.
Author Unknown, *Advertising Models and Associated Software*, Tracking Web Advertising, 1996, 5 pages.
Author Unknown, *Goldmail Revolutionizes Internet Advertising!*, Tracking Web Advertising, 1996, 4 pages.
Author Unknown, *Goldmail thinks consumers should get PAID for reading Advertising!*, Tracking Web Advertising, 1996, 4 pages.
Author Unknown, *Google Search, "Java Project, I am Volunteering My Time", Java Projec*, retrieved from http://groups.google.com/group/comp.lang.java.programmer/brows.s- ub.--thread/thread/5430a3 . . . , pp. 1-3, 1997.
Pitkow, James E. et al., *A Simple Yet Robust Caching Algorithm Based on Dynamic Access Patterns*, Graphics, Visualization & Usability Center College of Computing,Georgia Institute of Technology, 1994, pp. 1-8.
Pitkow, James E. et al., *Results from the first world-wide web user survey*, Journal of Computer Networks and ISDN systems, vol. 27, No. 2, GVU Technical report, pp. 1-15, date unknown.
Author Unknown, *Risks List*, Risks-Forum Digest, vol. 17, issue 83, 1996, pp. 1-11.
Fleishman, Glenn, *Web Log Analysis:Who's Doing What, When? Part 2/*, retrieved from web developer.com, pp. 1-14, date unknown.
Braun, Hans-Werner et al., *Applied Network Research: 1994 Annual Status Report*, Applied Network Research San Diego Supercomputer Center and University of California, 1995, pp. 1-15.
Brueggeman, Peter, *Monitoring CDROM Usage*, UCSD Scripps Institution of Oceanography Library, pp. 1-5, date unknown.
Bestavros, Azer et al.,*Application-Level Document Caching in the Internet*, In Proceedings of the Second Intl. Workshop on Services in Distributed and Networked Environments (SDNE 95), pp. 1-8, 1995.
Berners-Lee, Tim et al., *Uniform Resource Locators*, source unknown, 1993, 23 pages.
Bates, Marcia et al., *The Design of Browsing and Berrypicking Techniques for The Online Search Interface*, Graduate School of Library and Information Science, University of California at Los Angeles, 1989, pp. 1-19.
Ousterhout, John K. et al., *A Trace Driven Analysis of the UNIX 4.2 BSD File System*, Computer Science Division Electrical Engineering and Computer Sciences, University of California, 1985, pp. 1-29.
Glassman, Steven, *A Caching Relay for the World Wide Web*, Systems Research Center, Digital Equipment Corporation, pp. 1-10, date unknown.
Chankhunyhod, Anawat et al., *A Hierarchical Internet Object Cache*, Computer Science Department, Universities of S. California and Colorado, pp. 1-11, date unknown.
Claffy, Kimberly C. et al., *Traffic Characteristics of the NSFNET Backbone*, National Science Foundation, Joint study agreement with IBM, pp. 1-11, date unknown.
Bernstein, Mark et al. *Architectures for Volatile Hypertext*, Hypertext 91 Proceedings, 1991, pp. 243-260.
Author Unknown, *Matt's Script Archive:Book'em Dano*, source unknown, 1996, pp. 1-2.
Baskaran, Prakash, *Gamelan Who's Who More info*, retrieved from http://web.archive.org/web/19961027024909/www.gamelan.com/person.cgi?id=PB3, 1993, pp. 1.
Sukavirilya, Piyawadee Noi et al., *A Second Generation User Interface Design Environment: The Model and the Runtime Architecture*, Graphics, Visualization & Usability Center, Georgia Institute of Technology, pp. 1-10, 1992.
Author Unknown, *Real System 5.0 Security Features Whitepaper*, RealWorks, 10 pages, 1997.
Author Unknown, Web Authoring FAQ, source unknown, 2005, pp. 1-59.

Author Unknown, *RealServer Administration Guide Version 5.0*, Real Networks, Inc., 1995, 255 pages.

Author Unknown, *tcptrace homepage*, retrieved from http://www.tcptrace.org/, 1 page, date unknown.

Cooley, Robert et al., *Web Mining:Information and Pattern Discovery on the World Wide Web*, Department of Computer Science University of Minnesota, pp. 1-2, date unknown.

Mobasher, Bamshad, *Introduction, Next: A taxonomy of up: Web Mining: Information and Previous: Web Mining: Information*, retrieved from http://maya.cs.edpaul.edu/.about.mobasher/webminer/survey/node1.html, 1997, pp. 1-2.

Mobasher, Bamshad, *A Taxonomy of Web Mining: Next: Web Content Mining Up: Web Mining: Information and Previous: Introduction*, retrieved from http://maya.cs.edpaul.edu/.about.mobasher/webminer/survey/node2.html, 1997, pp. 1.

Mobasher, Bamshad, *Content Mining: Next: Agent-Based Approach Up: A Taxonomy of Previous: A taxonomy of*, retrieved from http://maya.cs.edpaul.edu/.about.mobasher/webminer/survey/node3.html, 1997, pp. 1.

Mobasher, Bamshad, *Agent-Based Approach: Next Database Approach Up: Web Content Mining Previous: Web Content Mining*, retrieved from http://maya.cs.edpaul.edu/.about.mobasher/webminer/survey/node4.html, 1997, pp. 1-2.

Mobasher, Bamshad, *Database Approach: Next: Web Usage Mining Up: Web Content Mining Previous: Agent-Based Approach*, retrieved from http://maya.cs.edpaul.edu/.about.mobasher/webminer/survey/node5.html, 1997, pp. 1-2.

Mobasher, Bamshad, *Web Usage Mining: Next: Pattern Discovery Tools Up: A Taxonomy of Previous: Database Approach*, retrieved from http://maya.cs.edpaul.edu/.about.mobasher/webminer/survey/node6.html, 1997, pp. 1-2.

Mobasher, Bamshad, *Pattern Discovery Tools: Next: Pattern Analysis Tools Up: Web Usage Mining Previous: Web Usage Mining*, retrieved from http://maya.cs.edpaul.edu/.about.mobasher/webminer/survey/node7.html, 1997, pp. 1.

Mobasher, Bamshad, *Pattern Analysis Tools: Next: Pattern Discovery from Up: Web Usage Mining Previous: Pattern Discovery Tool*, retrieved from http://maya.cs.edpaul.edu/.about.mobasher/webminer/survey/node8.html, 1997, pp. 1.

Mobasher, Bamshad, *Pattern Discovery from Web Transactions: Next: Preprocessing Tasks Up: Web Mining: Information and Previous: Pattern Analysis Tools*, retrieved from http://maya.cs.edpaul.edu/.about.mobasher/webminer/survey/node9.html, 1997, pp. 1.

Mobasher, Bamshad, *Preprocessing Tasks, Next: Data Cleaning Up: Pattern Discovery from Previous: Pattern Discovery*, retrieved from http://maya.cs.edpaul.edu/.about.mobasher/webminer/survey/node10.html, 1997, pp. 1.

Mobasher, Bamshad, *Data Cleaning, Next: Transaction Identification Up: Preprocessing Tasks*, retrieved from http://maya.cs.edpaul.edu/.about.mobasher/webminer/survey/node11.html, 1997, pp. 1.

Catledge, L.D. et al., *Characterizing Browsing Strategies in the World-Wide Web*. School of Lit., Comm. and Culture Graphics, Vis., & Usability Ctr. GA Inst. of Tech. pp. 1-9, date unknown.

Cunha, C.R. et al., *Characteristics of WWW Client-based Traces*, Comp. Sci. Dept., Boston University, Jul. 1995, pp. 1-18.

Staten, J., *Navigator tricks raise concerns*, MacWEEK, Mar. 1996, vol. 10, No. 11 pp. 18(2).

Zeigler, B., *The Wall St. J., Start up NetCount Seeks to Tally How Many Web Surfers See Ads*, source unknown, Oct. 1996, pp. 1-17.

Author Unknown, *I/PRO is First to Develope a Solution for Measuring Java Applets*, PR Newswire Assoc., Inc., Apr. 1996, 20 pages.

Weber, T.E., *The Wall St. J. , New Software Helps Advertisers Get Through Tangled Web Page*, source unknown, Oct. 1996, pp. 5.

Loverso, J.R., *Netscape Nay. 2.0 exposes user's browsing history*, The Risks Digest, Feb. 1996, 5 pages.

Kaniba, T., *Personalized Online Newspaper*, NEC 1996, vol. 49, No. 7, pp. 11-16.

Bertot et al., *Web Usage Statistics: Measurement Issues and Analytical Techniques*, Government Information Quarterly, 1997, vol. 14, No. 4, pp. 373-395.

Montgomery, *Using Clickstream Data to Predict WWW Usage*, source unknown, Aug. 1999, 27 pages.

Shahabi et al., *Knowledge Discovery from Users Web-Page Navigation*, source unknown, 1997, 11 pages.

Cooley et al., *Data Preparation for Mining World Wide Web Browsing Patterns*, source unknown, 1999, 27 pages.

Cooper, *Design Considerations in Instrumenting and Monitoring Web-Based Information Retrieval Systems*, Journal of the American Society for Information Science. 49(10), 1998, pp. 903-919.

Covella et al., *Self-Similarity in World Wide Web Browsing Patterns*, source unknown, 1999, 27 pages.

Mulvenna et al., *The 'Soft-Push': Mining Internet Data for Marketing Intelligence*, source unknown, 1997, 12 pages.

Seshan et al., *Spand: Shared Passive Network Performance Discovery*, source unknown, Dec. 1997, 13 pages.

Paliouras et al., *Web Usage Mining as a Tool for Personalization: A Survey*, source unknown, 2003, 61 pages.

Gotta et al., *Performance Evaluation of Web Applications*, source unknown, 1998, 13 pages.

Author Unknown, COMSCORE, Inc.'S Supplemental Responses to Nielsen's Interrogatory Nos. 1, 2, 11, and 17, Aug. 4, 2011, pp. 1-11, Filed in The United States District Court for the Eastern District of Virginia Norfolk Division.

Author Unknown, Exhibit C to COMSCORE, Inc.'S Supplemental Responses to Nielsen's Interrogatory Nos. 1, 2, 11, and 17, Prior Art for U.S. Patent No. 7,376,722, Aug. 4, 2011, pp. 1-470, Filed in The United States District Court for the Eastern District of Virginia Norfolk Division.

David Birkes et al., "Alternate Methods of Regression," John Wiley & Sons, Inc. (1993), pp. 1-239.

Author Unknown, "Digital Planet Announces Creation of Netcount; 'Nielsens for the Net' Creates Vast New Marketing Potential for World Wide Web," Business Wire, Apr. 19, 1995, pp. 1-2.

Kirthi Kalyanam et al., "Data Reconciliation, Reducing Discrepancies in Audience Estimates From Web Servers and Online Panels," Oct. 4, 1999, pp. 1-39.

Mark L. Berenson et al., "Business Statistics: A First Course," Prentice Hall, 1998, pp. 1-50.

Rex Briggs et al., "The Ecological Inference Problem in Internet Measurement: Leveraging Web Site Log Files to Uncover Population Demographics and Psychographics," Proceedings of the INFORMS Mini-Conference on Marketing Science and the Internet, MIT Sloan School, Mar. 7-8, 1998, pp. 1-19.

* cited by examiner

NETWORK RESOURCE MONITORING AND MEASUREMENT SYSTEM AND METHOD

CLAIM OF PRIORITY

This application is a continuation application of U.S. patent application Ser. No. 13/098,358, filed Apr. 29, 2011, now U.S. Pat. No. 8,112,511, which is a continuation of U.S. patent application Ser. No. 12/780,890, filed May 15, 2010, now U.S. Pat. No. 7,953,839, which is a continuation of U.S. patent application Ser. No. 12/100,685, filed Apr. 10, 2008, now abandoned, which is a continuation of U.S. patent application Ser. No. 09/763,338, entitled "NETWORK RESOURCE MONITORING AND MEASUREMENT SYSTEM AND METHOD," filed Sep. 5, 2003, now U.S. Pat. No. 7,376,722, which is a National Phase Entry of PCT/AU00/00937, filed Aug. 7, 2000, which claims the benefit of Australian Application No. PQ2063, filed Aug. 6, 1999, all of which hereby are incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present invention relates to a system and method for measuring and/or analysing usage of resources. More particularly the present invention relates to measuring and/or analysing usage of resources on a network using data sources retrieved from actions performed by users of the resources, such measurement and/or analysis providing information about resources that do not have available statistics, (such as site centric measurements) and combining them with site centric data to create a more accurate whole of market picture or components thereof.

BACKGROUND ART

In the light of high penetration of Internet use and the rapid growth of the on-line industry, there has become a need for an accurate and independent Internet site rating service. Such a service should provide on-line industry users and organisations and other interested parties with a precise vehicle with which to assess vital Internet site traffic dynamics. For example, it would be advantageous for such users and organisations to have an accurate picture of the information that Internet users were viewing on and interacting with particular websites, as well as the range of sites that target markets were visiting, the advertisements being viewed and how particular sites compared statistically with competitor sites. This type of commercial information is invaluable to those in the on-line industry wishing to properly target their markets and also focus their on-line presence.

Furthermore, to date there has been no product or service for the on-line industry users and organisations that provides a total market rating system that uses site centric measurements, such as proxy and server log files, browser based measurements, and user centric measurements, such as panel data and sample survey data. Furthermore, site and user centric measurements have not been used to collect data relating statistics pertaining to, for example, a website that has no site centric measurement data available. By providing the sites with such information it provides a more accurate picture about the Internet population and which sites the population use or visit regardless of whether the site centric measurements are available or not for a particular site.

A syndicated multi media marketing data base has been used in Australia which integrates consumer demographics, product usage and media consumption for value-added marketing and media solutions. The data base enables advertising planners, buyers and users to target their advertising campaigns and to plan and evaluate integrated media campaigns based on the only official buying and selling currencies for mainstream Australian media. The data base utilises the strengths of the media industries most widely used research tools such as TV ratings data, radio ratings data, readership surveys and service usage questionnaires. Each reporting period the operator of this data base uses a combination of data to integrate TV viewing data, updated each period, at the program level into a respondent single source data set which may comprise up to say 40,000 respondents. This method is used as a more integrated method of producing data sets capable of cross-referencing television with other media and consumption variables. This approach allows viewing information from the audited television ratings to be analysed against usage, consumption and other media information. The television data base is refreshed periodically so that the most current television program data is available with ratings consistent with the operator of the data base.

The abovementioned system does not allow the "fusion" of one data source created from measuring interactions of a sample of users in relation to their use of the resources, for example use of the internet, and a further source of data pertaining to interactions provided by all users of the resource, measured from for example a website, or viewers of a program measured by a television station to obtain accurate estimates of traffic densities at for example a particular website or television program where the particular website or television station does not have the further source available.

Known measurement techniques include that of a server log file analysis. In this method a log file is kept on the server of all record files requested, IP addresses of those visiting the site as well as successful downloading of all resources delivered from the site server. This method, however is not necessarily an accurate indication of resources used and/or viewed on the site, due to the method not being able to account for resources that are subsequently stored in proxy server caches or browser caches and are re-viewed. For example popular web pages may be stored on various Internet Service Providers (ISPs) proxy servers around the world, so that the ISPs do not need to directly access a popular site every time a user requests access to that site. The ISP simply provides access to their stored version of the site. This enables the ISPs to provide a more efficient service, but results in a less accurate measurement service due to the inability to monitor caches.

Similarly, once a site is accessed, site resources are saved in the user's browser cache, while in use. While the server log file analysis may have recorded data relating to the accessed resources at the time they were accessed, if the user then returns to one or more pages, such as by hitting the "back" button on their browser, then the resource being returned to is typically accessed from their browser cache, so that once again this page request is not recorded by the server log file.

Another method used by some organisations is the so-called browser based measurement approach. In this method, software monitors site resources as they are viewed within a browser. This software monitors the user's actions when accessing the Internet. While this approach does not suffer the accuracy problems of server log file analysis, a problem that does exist with this approach is that for a complete market analysis all sites need to be willing to agree to install the measurement code on every site page. In practice, it has proven quite difficult to obtain cooperation with all sites.

In another method, also used by some organisations, Internet users are recruited and their individual usage of the Internet is monitored to be used in statistical analysis. Usage is monitored by installing hardware and/or software on the user's computer. This hardware or software is not transparent for the user and is often quite onerous, requiring the user to log the software on each time they use it.

An example of this method is provided in U.S. Pat. No. 5,675,510, where personal computer use is measured through the use of a hardware box physically located on the user's computer. This hardware records log files of Internet access by the user. This process is expensive due to the hardware costs, installation costs and maintenance and support costs. Furthermore, the process is quite obtrusive, as the users are very conscious of the tracking as they see the box every time they use their PC. Furthermore, the process does not track access of monitored users where for example, a monitored user accesses the internet at a location other than at the user's home or work. Examples of location that are not monitored are cyber cafés, educational facilities, friend's homes etc.

There is considered to be a need for an alternative measurement approach that provides accurate results and also has improved transparency for the user.

SUMMARY OF THE INVENTION

According to a first aspect of the invention there is provided a method of measuring and analysing multiple data sources over a communications network in order to ascertain information about the use of one or more resources linked to said communications network, said method comprising the steps of:

obtaining a data source for a first group of one or more monitored resources, said first group linked to said communications network;

obtaining a further data source for a second group of one or more monitored resources or a group of monitored users, each of said second group and said group of monitored users linked to said communications network and combining said data source and said further data source to form a single data source available to interested parties so as to ascertain usage information on one or more resources.

The combining step may include one or more of displaying, aggregating, transforming, calibrating or formatting said single data source via a reporting server means through said communications network.

According to a second aspect of the invention there is provided a system for measuring and analysing multiple data sources over a communications network in order to ascertain information about the use of one or more resources linked to said communications network, said system comprising:

a first group of one or more monitored resources, comprising resource servers;

a second group of one or more monitored resources, comprising resource servers, a data collection and processing means for receiving a data source for said first group of one or more monitored resources, and for receiving a further data source for said second group of one or more monitored resources; and reporting means for displaying said data source and said further data source as a combined data source to interested parties so as to ascertain usage information on one or more resources.

According to a third aspect of the invention there is provided a system for measuring and analysing multiple data sources over a communications network in order to ascertain information about the use of one or more resources linked to said communications network, said system comprising:

a first group of one or more monitored resources, comprising resource servers;

a second group of one or more monitored users, comprising resource servers;

a data collection and processing means for receiving a data source for said first group of one or more monitored resources, and for receiving a further data source for said second group of one or more monitored users; and reporting means for displaying said data source and said further data source as a combined data source to interested parties so as to ascertain usage information on one or more resources.

According to a fourth aspect of the invention there is provided a network enabling internet access by a user computer, characterised in that a connection means on the user computer may be set to enable connection between a proxy server and the user computer such that the proxy server is communicably coupled between the connection means on the user computer and any internet site servers in order to monitor the internet usage of the user.

In this regard, the expression "connection means" is taken to refer to the means by which a user is provided with internet access, such as an internet browser. Additionally, the user computer may be any means capable of receiving and displaying information from the internet, such as a set-top internet terminal.

According to a fifth aspect of the invention, there is provided a method of enabling research in a communications network having at least one user computer with an internet browser, the method comprising the step of:

altering a proxy setting of the browser of the user's computer to divert the user computer's internet access through a proxy server.

Therefore, by making a small change to the setting of a user's connection means/network browser at only one point in time, it is possible to analyse the user's network usage, without the need for installing any software, impacting on user time or diverting their attention. This method also is able to overcome the measurement problems pertaining to resources stored in caches.

According to a sixth aspect of the invention there is provided an apparatus for measuring usage of internet resources, comprising:

a proxy server in communicable relation with a user browser, the communicable relation effected via a proxy setting of the browser, such that the user browser is capable of accessing at least one internet resource via the proxy server, and the proxy server is capable of initiating usage measurement of the resource accessed.

According to a seventh aspect of the invention there is provided a method of measuring usage of internet resources comprising the steps of:

enabling a user's browser proxy setting to reference the location of a proxy server;

receiving an internet resource request at the proxy server from the user's browser;

forwarding the resource request to a resource server to obtain the requested resource;

receiving the requested resource at the proxy server from the resource server; and passing the requested resource to the user's browser after the insertion of a measurement code to monitor the usage of the requested resource.

And finally according to an eighth aspect of the invention there is provided a system for measuring and analysing multiple data sources over a communications network in order to ascertain information about the use of one or more resources linked to said communications network, said system comprising:

a plurality of resource servers;

an insertion server linking each resource server of said plurality of resource servers to said communications network;

such that when a request for a monitored resource from any one of said resource servers is made, measurement code is inserted into said requested monitored resource by said insertion server for the purposes of measuring and analysing usage of the monitored resource.

BRIEF DESCRIPTION OF THE DRAWINGS

The invention will be hereinafter described in one or more preferred embodiments with reference to the accompanying drawings, wherein.

DETAILED DESCRIPTION

Figure 1:
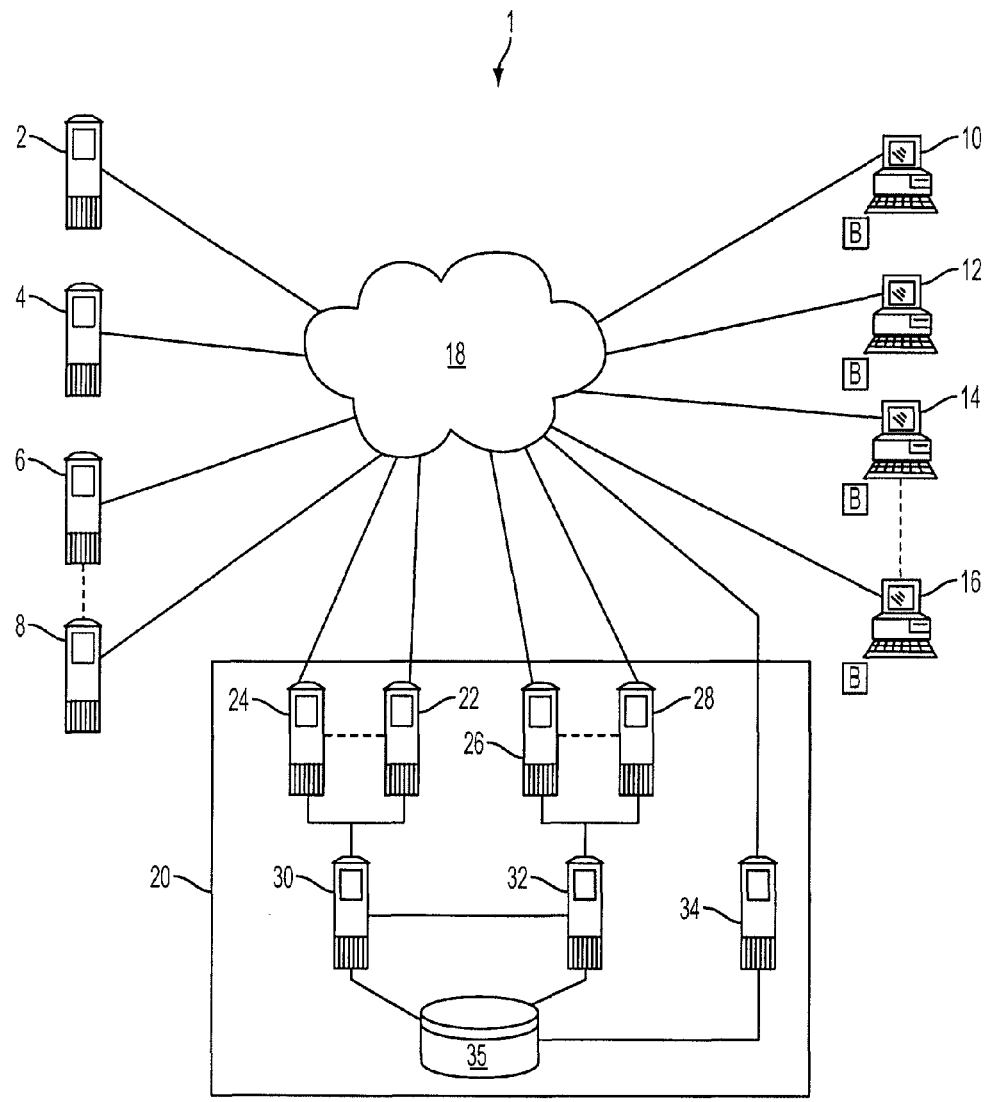
FIG. 1 is a schematic diagram of a system for measuring and analysing data from data sources according to a first embodiment of the invention, particularly in relation to the use over the internet.

Shown in FIG. 1 is a system 1 used to measure and analyse data in accordance with the present invention. Various users, having user interface means 10, 12, 14 and 16, are linked to a communications network 18 which also has links to various resource servers 2, 4, 6 and 8 through which the users can access resources. There is generally a plurality of user interface means which may include but is not limited to the following group: PCs, handheld devices such as mobile telephones or palmtops, television receivers or monitors or any user interface device capable or having information entered into, interacted with or viewed by the user. There may be a plurality of resource servers of which 2 to 8 are examples. The communications network 18 may be the Internet or a digital or analog television network or any circuit-switched or packet-switched network.

The embodiment shown in FIG. 1 will be described with particular reference to the Internet and the measurement and analysis of data sources from monitored resource servers, for example servers 2 and 4, unmonitored resource servers, say servers 6 and 8, and browsers installed on the user interface means. One data source is measured using monitored resources. This data source may comprise site centric measurements such as census data or audit data, proxy or server log files, implemented using Java, JavaScipt or CGI. The resources may be any one of a web page (to measure the number of accesses to the web page), time spent on a web site or web page, page impressions or a feature of a web page or web site that is interacted with by one or more users or offers the option of a response to the users. Resource owners agree to have their resources monitored to determine more information about the behaviour of users who access these resources. Measurement code, a form of program code, is embedded in for example every web page or embedded in each resource to be monitored. Every time a user accesses the monitored resource the measurement code in the downloaded resource records and collects information on that user and all such recordings for all users who access that resource are forwarded to a data collection and processing means 20. Every page could physically have code embedded therein or be dynamically inserted by another component, such as a separate server 130 (as shown in FIG. 6(b)), on its path to the user. Specifically the data source from servers 2 and 4 is received by a first collection server means comprising one or more collection servers 22, 24. The abovementioned data source is then forwarded to a processing server means 30 for processing, formatting, etc and thereafter stored in data storage means 35. The stored data may then be accessed by a reporting server means 34 such that the data is displayed or manipulated in some manner when accessed by interested parties through the network 18. All of the server means 22, 24, 26, 28, 30, 32, 34 and 35 form part of a data collection and processing means 20 and each of the tasks performed by these server means may be performed by one individual server or a group of servers. For example, the collection servers and processing servers may be one and the same server.

With reference to FIG. 6(b) an insertion server 130 may be used to forward all requests between the resource servers 2, 4 and 6 and the users 10, 12 and 14. Measurement code can be inserted by the insertion server 130 into each monitored resource requested from a respective resource server.

A further data source may be measured and analysed from a group of one or more monitored or participating users. A random sample of monitored users is recruited to form a panel from whom their interactions are measured and recorded in terms of accessing monitored and unmonitored resources, at the resource servers, via each user's browser, indicated by "B" in FIG. 1. The monitored users give their permission to allow the monitoring and tracking of their actions or interactions and provide their personal details, such as where they live (region), sex, age, income, home or business user. Reliable statistics on Internet population data collected is used to determine preset demographic quotas for the recruitment process. These users should be demographically representative of the preset quotas, according to such criteria as age, sex, income and whether or not the user is a business user or a private user.

The further data source may comprise user centric measurements including panel data, sample data, survey data. Each monitored user of the group (otherwise termed a "panellist") will have every page impression, web site access, or time spent on a site or page or any other characteristic measured and recorded via measurement code which is downloaded together with the requested resource to the panellist's browser B. For example, then, if user interface means 10 and 12 are used by panellists each time they access or interact with monitored resources, at servers 2 and 4, and/or on unmonitored resources through servers 6 and 8, these are recorded by a second collection server means comprising one or more collection servers 26, 28. Identification means is transmitted to the collection servers 26, 28 identifying the user, after each interaction is recorded, either through some form of identification means or cookies.

Processing server means 30 and 32 respectively receive the data source and further data source to process the data. Thus processing server 32 processes data forwarded to it from the second collection server means. Examples of processing include aggregating or formatting the data, or calibrating the data for a particular purpose. One example of processing the data sources includes calibrating them for a particular purpose, such as calculating an error rate to determine an estimate for interactions, such as page impressions, for an unmonitored site for which there is no site centric data available. At this stage the received further data sources, as processed by the processing servers 30 and 32 and subsequently stored in storage means 35, may be viewed or displayed by interested parties on reporting server 34. An example of the calibration process will hereinafter be described.

It is to be noted that the further data source may be of the same type as the first mentioned data source, that is, from monitored resources.

Weighting may be performed to the collected data source and further data source in each of the collection servers 22 to 28. This is performed by the processing servers 30 and 32. The weighting is done to adjust for the difference in demographic profiles of the sample or group to the population. The population weightings are obtained from pre-established internet population statistics for a certain time period. This step ensures that the collected data, after the weighting process, is representative of the Internet population of the measured geographical region. To derive greater accuracy a further breakdown of the official data showing the Internet population statistics may be performed into a combination of various groups or subjects. Such groups may include sex, age, current access method, income. Thus the collected data from page impressions from the sample users may be tabled in terms of each of the categories mentioned above to provide a more accurate picture to interested groups. Furthermore, the breakdown may be in terms of categories relating to the types of monitored resources, for example, sport, politics, entertainment, business.

There will be an overlap of the data source and further data source results where a monitored resource, having say site centric measurements available, has corresponding further data source results pertaining to panellists. Thus, for example, for a monitored web site there is panel data collected from each of the panellists for the same monitored web site. Comparable data is therefore taken from the two corresponding different sources, being panel data which may pertain to various interactions performed by the panellists, and the abovementioned site centric measurements.

If, for example a panel or group of 3000 users are registered from which panel data is obtained, then a weighting function is applied to determine or estimate actual traffic levels for all internet users in a particular region. For example in Australia, there is an estimated total internet audience of 4.4 million. Weighting is simply applied as a multiplication factor which brings the representative sample in line with the total traffic market trends, that is, 4,400,000/3000=1466.7. All unique visitor numbers for sites or page impressions are multiplied or weighted by this factor in order to estimate the actual traffic levels.

Of the 3000 users who are taking part in the panel, say 2000 users, visit a monitored web site (resource) from server 2 or perform particular interactions on that web site which has corresponding site centric measurements output available, and another 2500 panellists visit a web site that is not monitored, say at server 8. As the other web site is not monitored then there is no site centric measurement data available and so to estimate the total traffic or users that would access the other web site or perform particular interactions on that web site or on a web page of that web site, the following occurs.

The 2000 users who have accessed the web site that is monitored, at server 2 is scaled up in accordance with the internet. Thus, we arrive at a figure of the total number of the internet audience being 4,400,000, divided by the number of panellists taking part in the sample, being 3000, and multiply this by 2000, which represents the number of panellists estimated to have actually visited that site. This results in an expected 2,933,333.3 users in the internet population to visit this site over the predefined period. This is the ideal situation where we would expect the numbers obtained, after scaling up, and the actual site centric measurements to correspond exactly. Equivalently, the number of users in the internet audience you would expect to visit the unmonitored site, at server 8 is 4,400,000/3000×2500=3, 666,666.6 visits.

However, inherent in the sampling there are expected to be deviations and therefore calibration in terms of an error rate is introduced, being the ratio of the site centric measurements to that of the equivalent panellist metrics. Separate metrics may be used to improve accuracy, such as one for page impressions, advertisement views, unique visitors, or other traffic measurements or other resource metrics. Each of the error rates are derived for the metrics for the particular period under review.

Thus, for the above example, if the actual census data for the number of visits to the monitored web site is 3,200,000, then the actual deviation is 3,200,000/2,933,333.3 which provides a ratio of 1.0909 so that the sample has an error rate of a factor of 0.0909. This ratio of 1.0909 is then multiplied by the derived figure above (3,666,666.6) for the site that is not monitored which is equivalent to 4,000,000 visits or use of the attributes.

The above derived example related to using only one monitored site. However, similar or other techniques can be applied on a group of resources, such a number of web sites or advertising page impressions. Furthermore different metrics, based on different requirements may need alternative calibrations, such metrics including page impressions, unique visitors or time measurement. The calibration may be based on two data sources or more than two data sources, whether they be from monitored or unmonitored resources.

Thus, by using the above method, sites that are not monitored can have additional data available to them to estimate the amount of traffic which provides an invaluable resource to interested parties to specifically target users in respect of various activities or interactions that they have undergone in accessing a particular web site. Furthermore, it provides additional information to owners of monitored web sites as to how many visits or interactions/responses unmonitored web sites (being potential competitors to such owners) have had from the internet audience, based on the two or more sources of data, from the site centric measurements and/or from the user centric measurements, or simply based on the site centric measurements. Thus more information is available about the behaviour of the internet population or audience.

In the abovementioned process, in order to produce comparable data, sites having site centric data collected are grouped into the same grouping of sites which is made in the user centric data. Thereafter, the same groupings of URLs in the site centric and user centric groups are then formed. Naturally, the bigger this group accounts for in terms of the number of monitored resources or page impressions for example, the more accurate the end results are expected to be.

Figure 2:
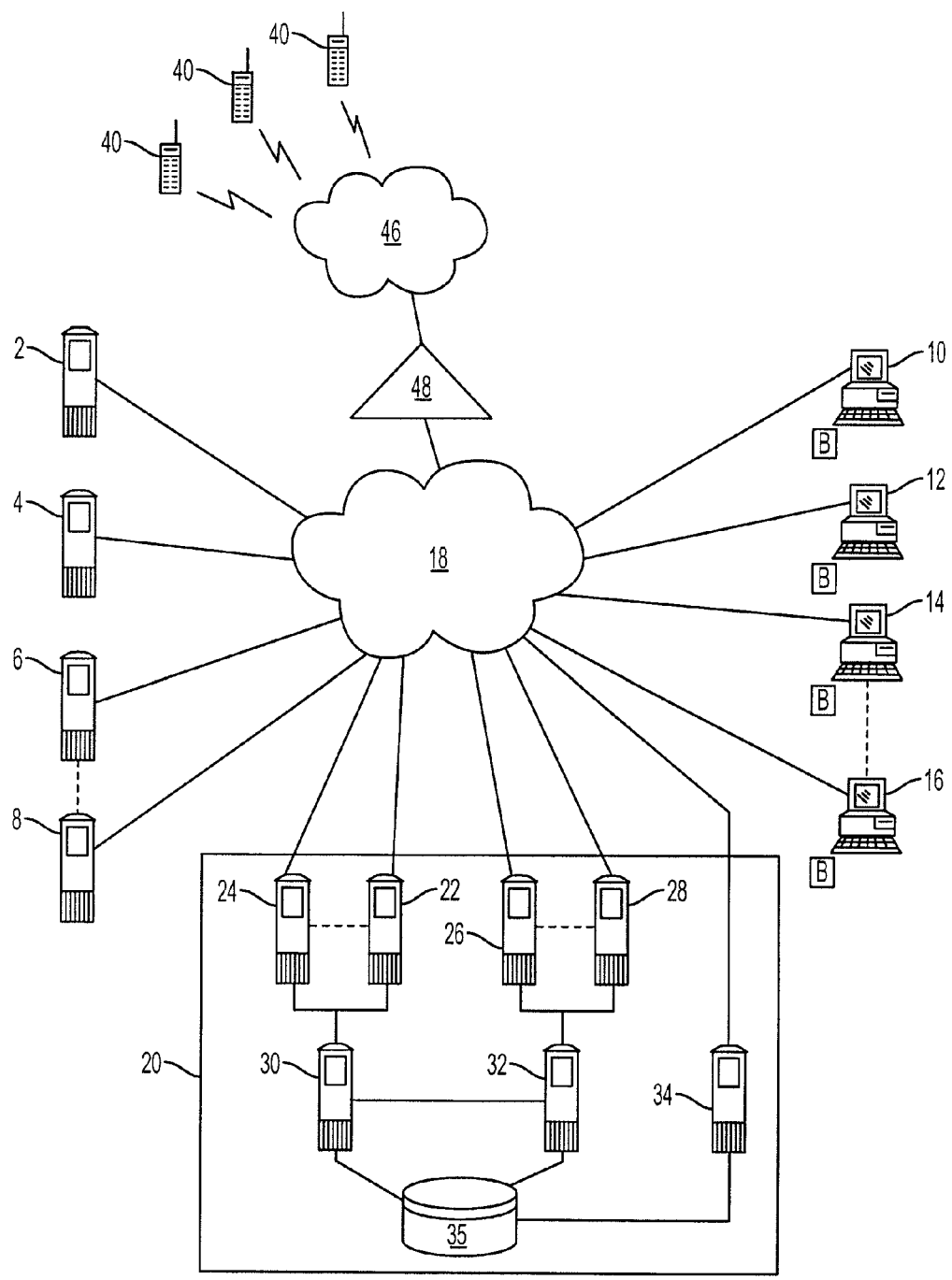
FIG. 2 is a schematic diagram of a system for measuring and analysing data from data sources according to a second embodiment of the invention, particularly in relation to accessing resources from WAP-enabled user interface devices.

With reference to FIG. 2, various users may have user interface means that are for example WAP-enabled processors such as a mobile telephone 40, linked to a cellular network 46 which in turn is linked to the internet 18 through a WAP gateway 48. Each of the WAP-enabled devices use the Wireless Mark-up Language (WML). Accesses to or interactions with a monitored resource are recorded by embedding measurement code in the monitored resource and this is forwarded to collection servers 22, 24 of the data collection and processing means 20 as in the previous example. Those users forming part of a panel or group have corresponding interactions monitored whereby measurement code, as mentioned earlier, is downloaded with the requested resource(s) into the WAP-enabled devices to monitor the actions or interactions of each of the users of the devices. Each of the interactions of the users are monitored and recorded by the measurement code for corresponding interactions on monitored and unmonitored resources and forwarded to collection servers 26, 28 of the data collection and processing means 20. Information in the form of reports may be displayed to interested parties after combining the two separate sources of data, as processed by processing servers 30 and 32, on reporting server 34. Again, this follows the forwarding of the processed data from the processing servers 30, 32 to data storage means 35 which is accessed by the reporting server 34. Of particular interest, information about interactions of the various users for sites that are not monitored is available by previously mentioned calibration techniques.

The above principles are easily adapted to Web television, whereby each of the devices 10, 12, 14 or 16 are television receivers such that users are monitored in terms of their responses or choices of options regarding a particular television program or television commercial. Thus there are a number of sample TV users having respective television receivers accessing the interne and are monitored in terms of their responses or interactions on a particular resource server by the abovementioned measurement code accompanying each of the resources being downloaded to each of the users' devices. For various resources the site centric measurement data is already available and there will be some resources that overlap with the recorded user centric data. Thus information pertaining to various interactions or actions by many users are obtainable for other sites that are not monitored which thereby provides a good comparison of resource usage, for example, of various web sites to interested parties.

Figure 3:
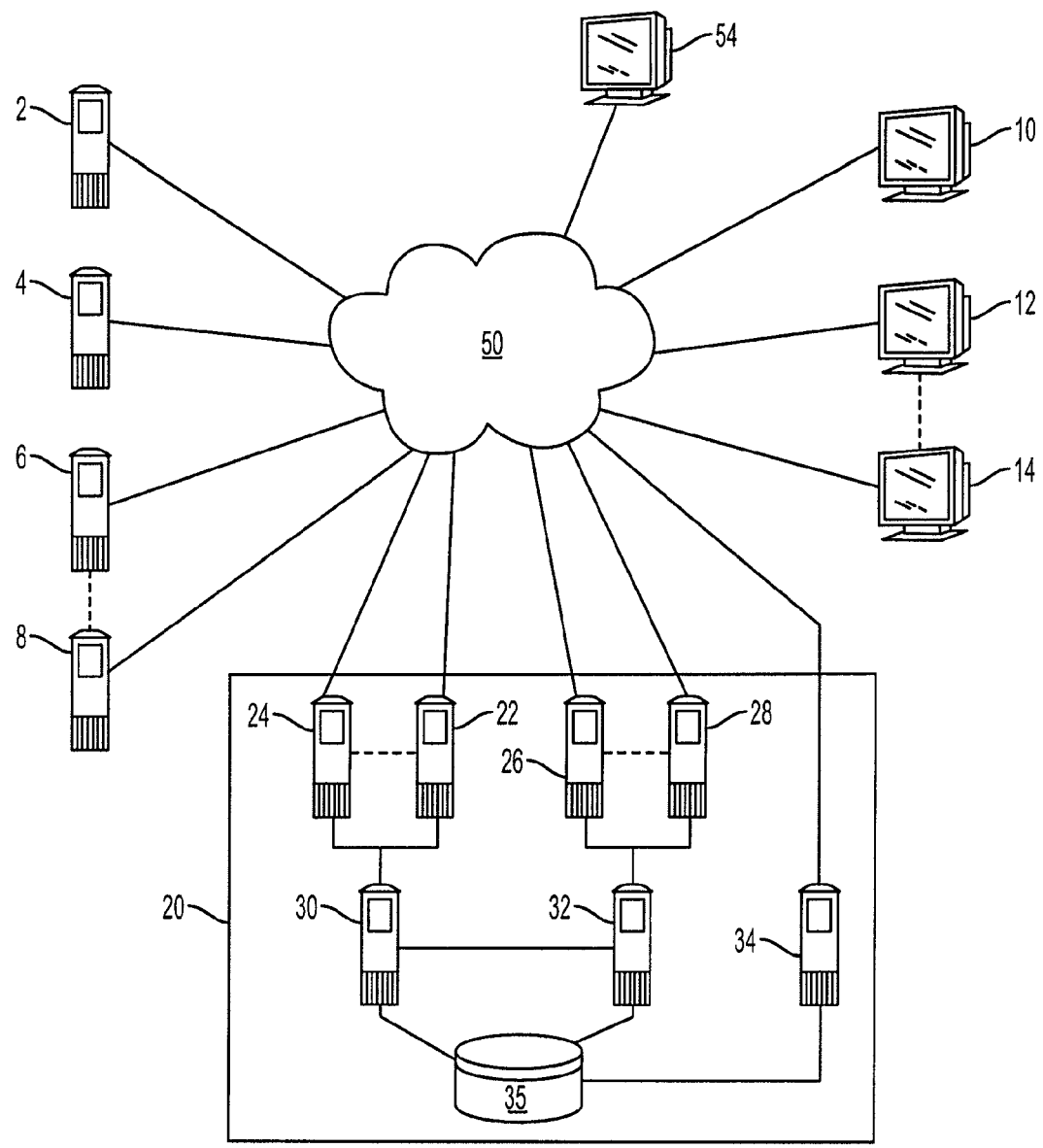
FIG. 3 is a schematic diagram of a system for measuring and analysing data from data sources according to a third embodiment of the invention, particularly in relation to using a digital television network.

With reference to FIG. 3, there is shown a digital television network 50 to which are linked various television receivers 10. 12 and 14 that have users who have agreed to be part of a survey for monitoring their responses or actions for a particular resource such as a television program or commercial. There are also other users 54 who have digital television receivers for which no monitoring is conducted. A television station resource server 2 will transmit various programs or advertisements over the digital network 50 and for some programs will already have site centric measurement data, such as audit or census data available on all of the users (users on receivers 10, 12, 14 and 54) who view the program and make responses or actions where required regarding that program or advertisement. Again, a sample of users is used to obtain panel data by measurement means to each of the sample user receivers 10, 12 and 14 that can track their movements and actions in relation to other unmonitored corresponding advertisements or other unmonitored programs from different television networks, such as TV station resource servers 4 and 6, as well as the monitored programs from TV station resource server 2. All this information can be used to calibrate or check panel data for which interested parties such as users in the on-line industry or those in the television industry can receive reports through reporting server 34 on popular programs that are watched or advertisements that are responded to across the whole digital television user population. The abovementioned error rate is also applicable in determining numbers of users who respond to or interact in other ways with resources that are not monitored. The data collection and processing means 20 includes the first and second collection server means 22 to 28, processing servers 30 and 32, data storage means 35 and reporting server 34 to undertake similar tasks as mentioned with respect to the embodiments described in FIGS. 1 and 2. Each of the collection servers and processing servers and the storage means 35 and reporting server 34 may be separate servers or function as one server unit. The data collection and processing means 20 may form part of a television station for calculating and collecting the data and the calibration applicable to unmonitored resources, such as other programs.

The medium in which the two data sources are obtained need not be the same. For example site centric measurement data may be obtained for internet based resources and be compared with or correlated with user centric measurement data for Web TV users or digital television users.

Figure 4A:
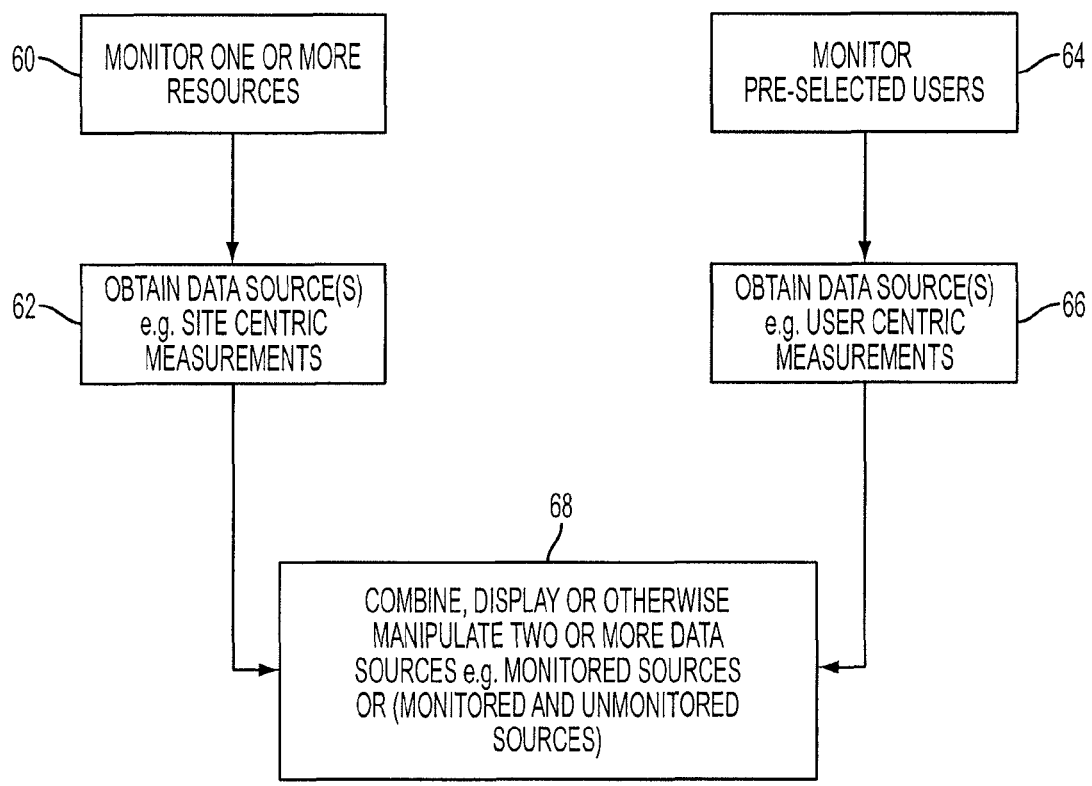
FIG. 4(a) is a schematic flow diagram showing the processes involved in measuring and obtaining various data sources generally in accordance with the invention.

With reference to FIG. 4(a), there is shown a number of steps used by the method and system of this invention in respect of any medium and resources thereof. Firstly, at step 60, a resource such as a web site or web page or television program, is monitored to determine and record all interactions with or accesses with the resource by all users having access to the resource.

A data source, such as site centric data, is obtained for one or more interactions at step 62 from all users who interact in some way with the monitored resource. This is recorded and collected by the collection servers 22, 24 of the data collection and processing means 20. By way of example, the number of visits to a particular web page has may be recorded.

After establishing a panel or group of users, at step 64 these users are monitored for their interactions and at step 66 a second data source, such as panel data or any other form of data, is measured, recorded and collected by collection servers 26,28 of the data collection and processing means 20. The panel data may comprise for example page impressions or the number of visits each panellist has for the monitored resource, such as a web site and every unmonitored resource. At step 68, the two sets of data sources may be viewed, combined or otherwise customised on server 34.

In FIG. 4(a) two or more data sources may be used for analysis, whether they originate from the same type of source, for example, monitored resources, or from different types of sources, for example, one or more monitored resources and/ or one or more unmonitored resources from monitored users.

Figure 4B:
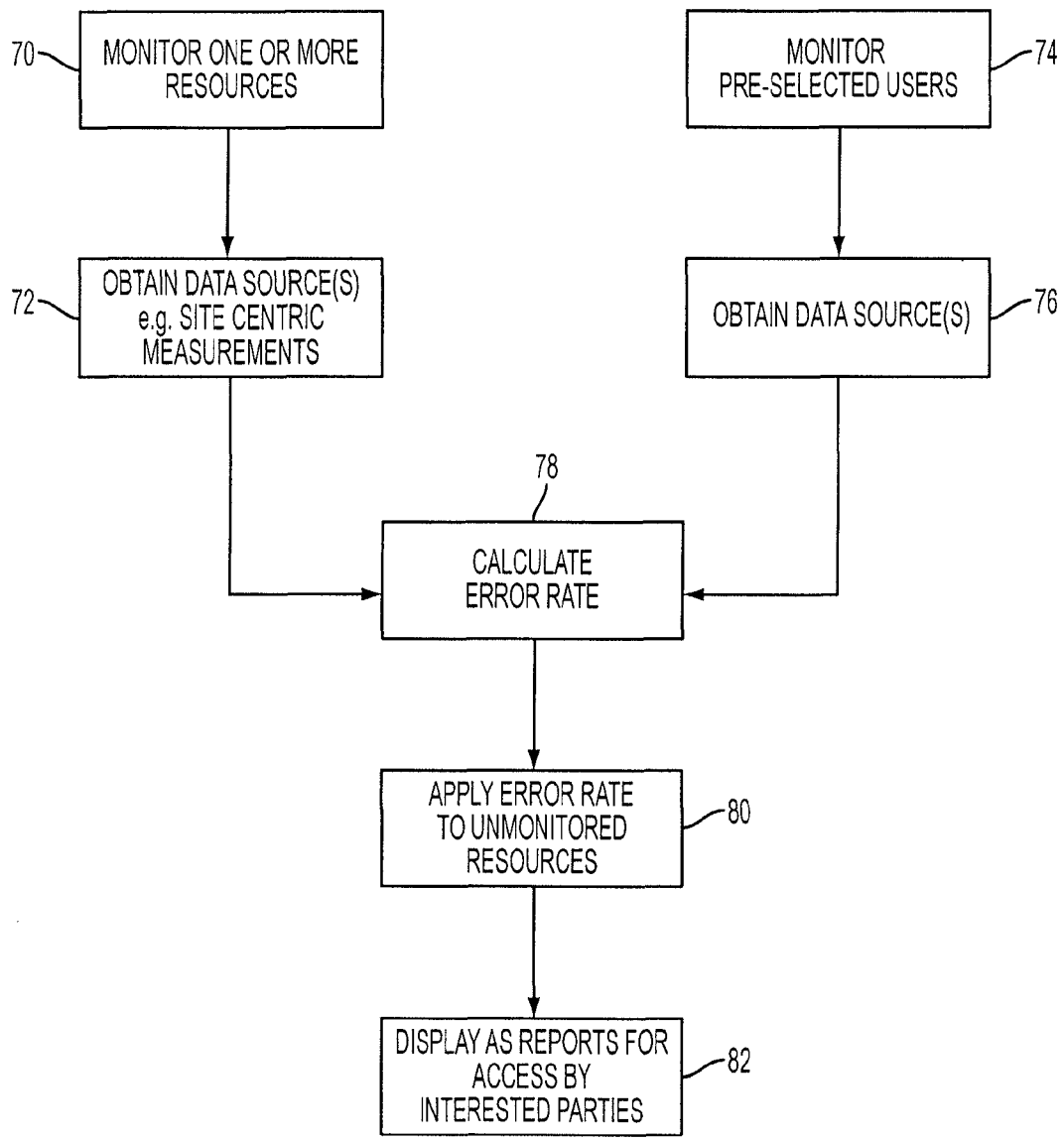
FIG. 4(b) is a schematic flow diagram showing the processes involved in measuring, obtaining and processing various data sources and applying results to extract data on unmonitored sources.

In FIG. 4(b), at step 70 resources are monitored, such as a web site access or page impression by all users and at step 72 a data source relating to site centric measurements is obtained for such web site accesses or page impressions. At step 74, pre-selected users are monitored for their interactions, corresponding to the monitored resource, for example the same web site accesses or page impressions and equivalently those same interactions of an unmonitored resource or resources. At step 76, the further data source relating to the above user centric measurements is obtained and forwarded to the collection servers 26, 28. Collection servers 22, 24 will have the data from step 72. Processing servers 30, 32 calculate or calibrate an error rate based on the two sets of data at step 78 after scaling up has taken place and then at step 80 the error rate is applied to the unmonitored resource(s) from steps 74 and 76. Reports on the results may be displayed on server 34 for access by users in the on-line industry after the processed data has been transferred to the storage means 35 from the processing servers 30, 32.

Figure 5A:
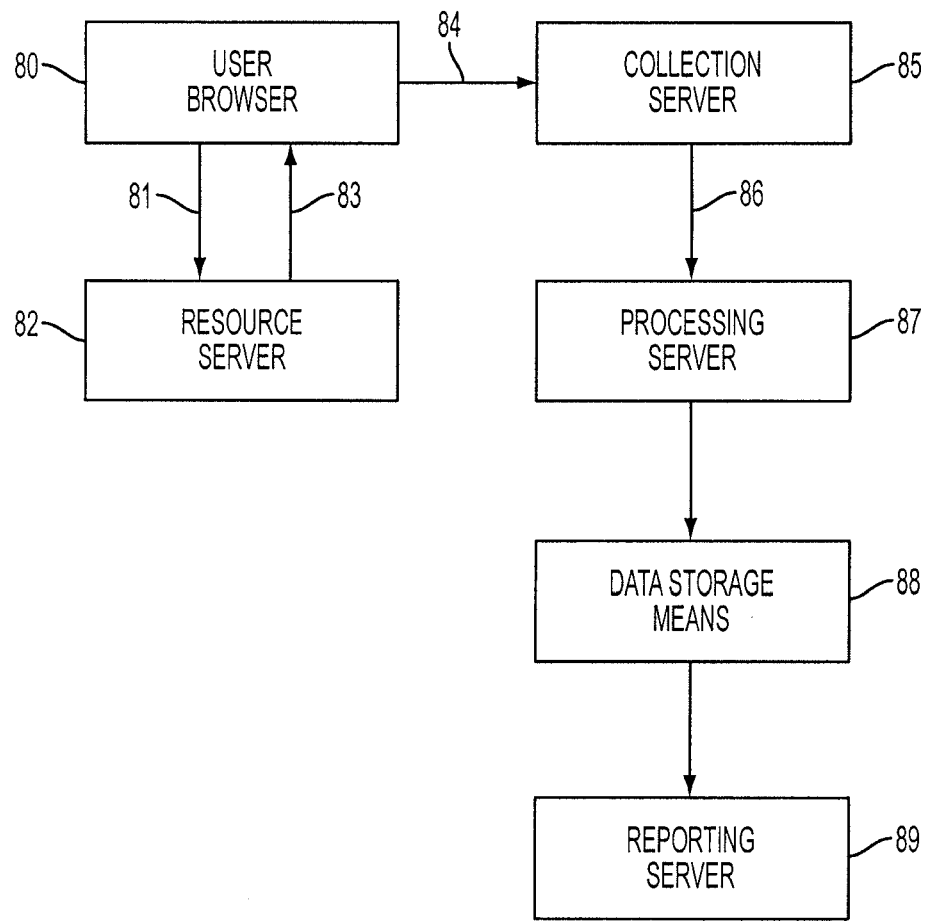
FIGS. 5(a) and 5(b) are block diagrams showing the processes involved with data when access is made to an unmonitored resource and a monitored resource.

In FIG. 5(a) there is shown processes used when a user's browser requests a monitored resource. The browser 80 first of all sends a request (81) for a monitored resource from resource server 82. The resource is sent back (83) from the server 82 to the browser 80 with measurement code which was originally embedded. The measurement code monitors and collects information on the usage of the resource by the user and at (84) a record of this is sent to the respective collection server(s) 85. Thereafter the record can be processed together with other user or site centric measurements by the respective processing server(s) 87. Where the user is a panellist, the measurement code would already have been sent to the panellist's browser and the interactions associated with a monitored or unmonitored resource recorded and sent to the respective collection server(s) 85. Thereafter it is processed by processing server(s) 87 and forwarded for storage to the data storage means 88. Reports may then be generated from the data storage means 88 to the reporting server 89.

Figure 5B:
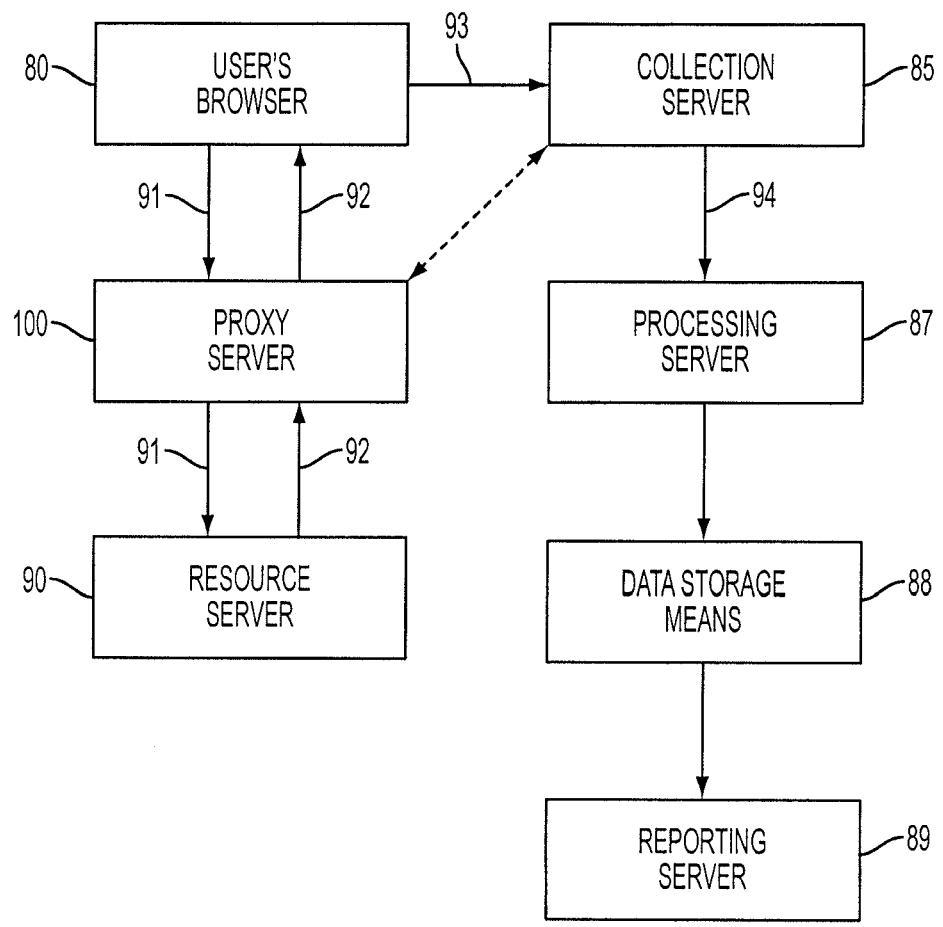

In FIG. 5(b) there is shown process steps when a panellist requests an unmonitored resource. The user's browser 80 makes a request (91) for the unmonitored resource at the resource server 90 through the proxy server 100 which returns (92) the request to the browser 80 via the proxy server 100. The proxy server 100 inserts the measurement code into the requested resource before forwarding the request to the browser 80. Then the measurement code monitors and collects information on the usage of the unmonitored resource and forwards this at (93) to the collection server(s) 85, which is then collated as user centric measurement data. It may then be processed by processing server 87 and forwarded on to reporting server 89 via the storage means 88 as previously described. It is to be noted that the collection server(s) 85 may also be one and the same server as the proxy server 100.

Rather than obtaining measurements through browsers, or equivalently some program means loaded onto a user interface device, specific software may be loaded onto the devices 10, 12, 14 or a "hardware" box may be attached to the devices so that the user may be aware that he or she is being monitored. Alternatively, a proxy server may be used.

Where a proxy server is used, it is invisible to the user and enables an organisation or interested parties to monitor the internet usage of the panel member as an alternative to installing software or firmware onto the panel member's user interface. An advantage of the transparency of this tracking technique is that it promotes panel continuity.

Figure 6A:
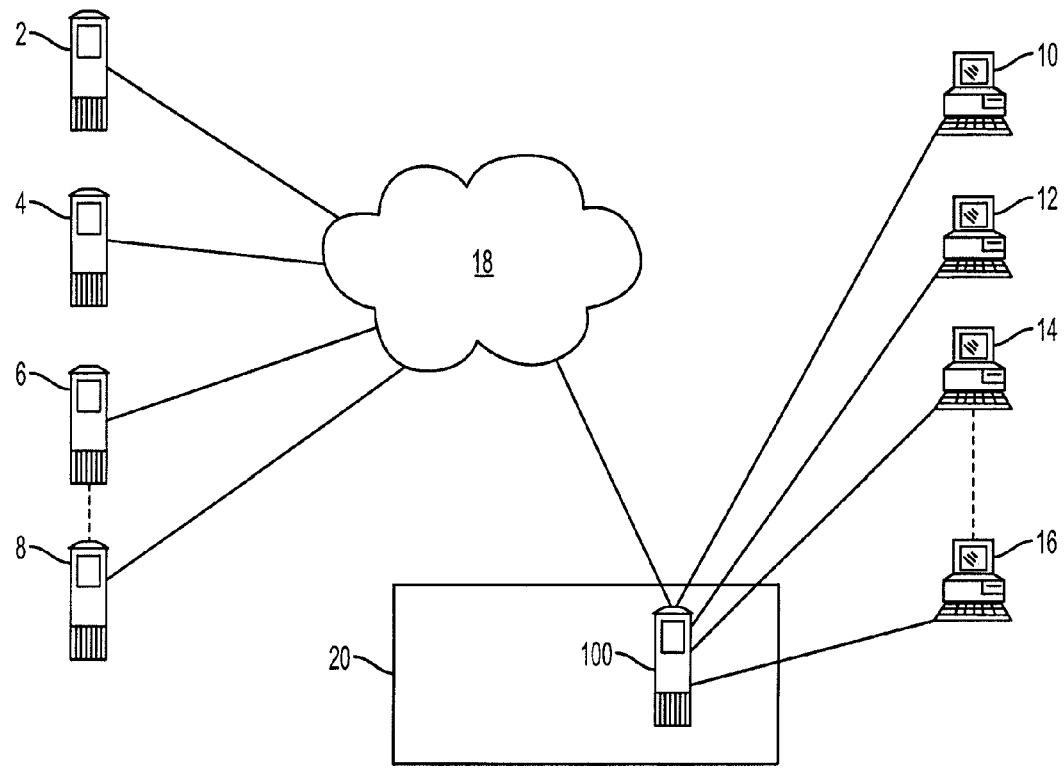
FIG. 6(a) is a schematic diagram of a system for measuring and analysing data from data sources according to a further embodiment of the invention using a proxy server.
Figure 6B:
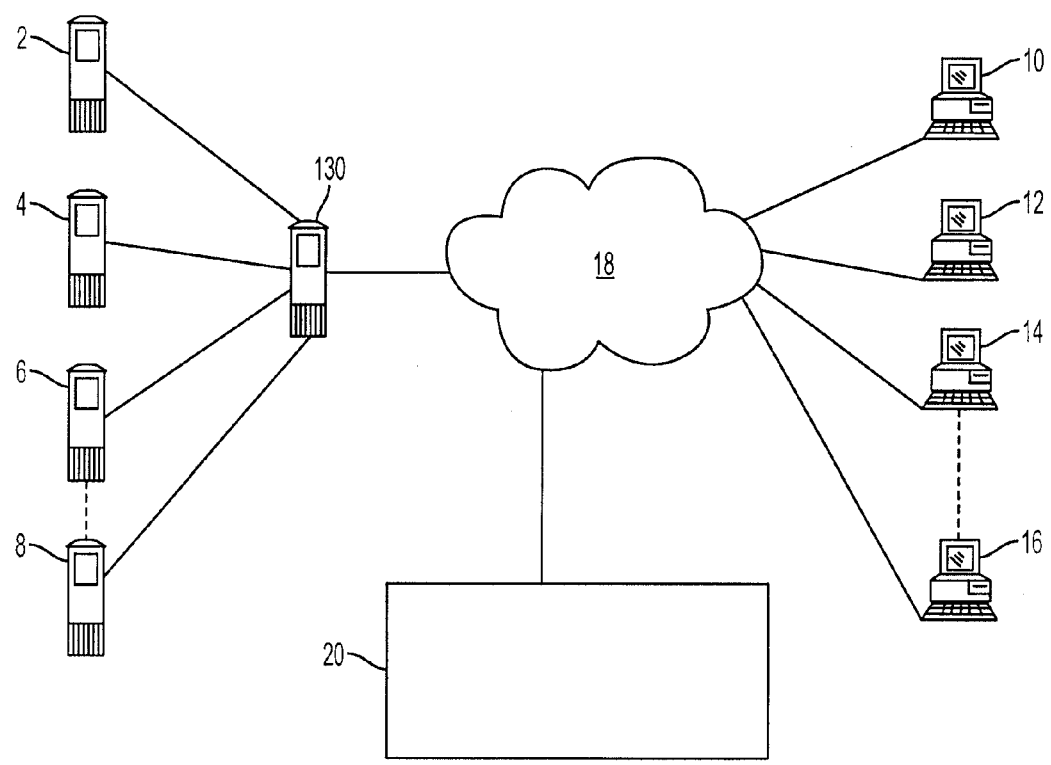
FIG. 6(b) is a schematic diagram of a system for measuring and analysing data from data sources according to another embodiment using an independent server.

In accordance with a further embodiment and with reference to FIG. 6(a), resource requests and responses between user interface devices 10, 12 and 14 and the resource servers 2, 4 and 6 go through a proxy server 100. The proxy server may form part of the data collection and processing means 20.

Once a user has agreed to become a panel member, the user is instructed to change his or her browser setting to access the internet via the proxy server 100. If the user has trouble in effecting this set-up, they may e-mail a helpdesk provided by the organisation or access a call centre via telephone.

Examples of the manual proxy set-up process will now be described with reference to some existing Internet browsers.

If the user has Internet Explorer 4.0 or 5.0, to divert their internet access through a proxy server, they would be required to select "Internet Options" from their "View" menu, then "Connection Folder", followed by "Access the Internet using a proxy server". In the address entry box, they would enter the address of the proxy server, which would be provided to them by the research organisation.

Alternatively, if the user had Netscape 4.0, they would be required to select "Preferences" in the "Edit" menu of their browser, followed by "Advanced", "Proxies", "Manual Proxy Configuration" and "View". In the http: entry box they would then be required to enter the address of the proxy server, as provided by the party initiating the network measurement.

As an alternative to the manual set-up process, a software program may be used to effect the browser setting change: for example, the user could click on a link, and the link would then implement the change.

Figure 7:
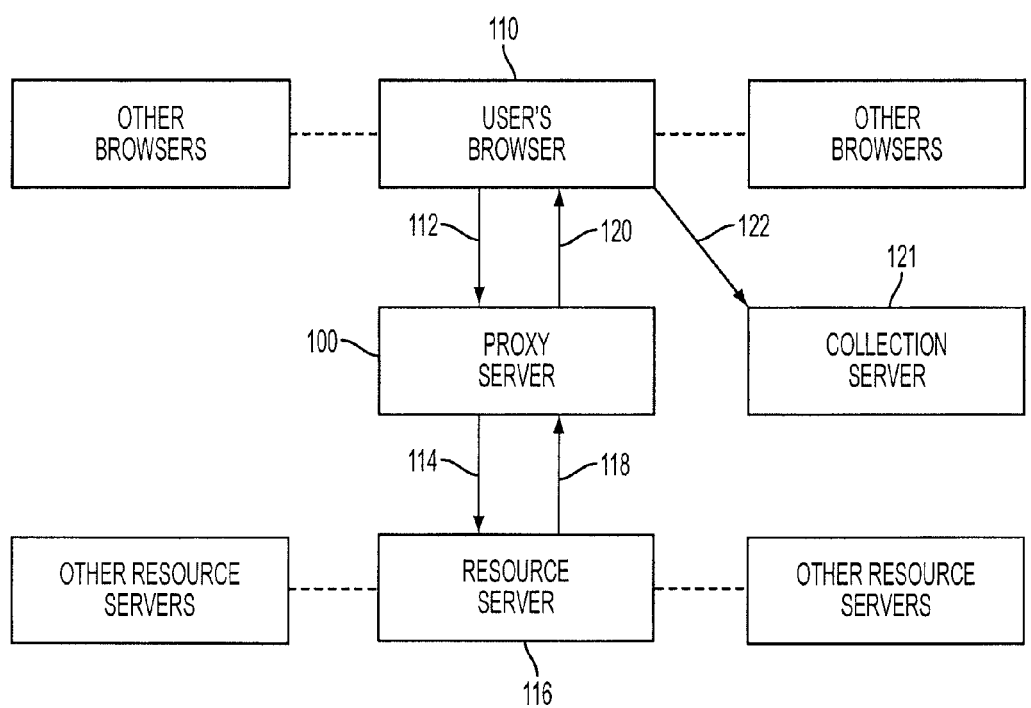
FIG. 7 is a schematic diagram showing the processes involved in accessing a resource via a proxy server.

With reference to FIG. 7, when a user requests a resource on their browser 110, the request first goes (112) to the proxy server 100. The request is then forwarded (114) by the proxy server 100 to the corresponding resource server 116. The resource server passes (118) the requested resource to the proxy server 100 and from there (120) the measurement code is embedded in the requested resource, at the proxy server 100 before it goes back to the user's browser 110 to record the interactions of the user. A record of this request is then sent (122) to the collection server of the data collection and processing means 20 for processing as part of the data source, where site centric measurements are collected for this particular user and other users in respect of similar resource requests. If the data relates to the further data source whether monitored or unmonitored, for example panel data of a panellist, like user centric measurements, then this procedure is repeated but the data is collected by the respective collection server 26, 28. It is to be noted that the collection servers 22 to 28 and the proxy server 100 may be the same server.

Thus, for some monitored resources there will be an overlap of site and user centric measurements for which data may be displayed separately or combined on reporting server 34. Alternatively an estimate of traffic data can be determined for those unmonitored resources having no site centric measurements available, using the aforementioned techniques.

When the access request is diverted to the proxy server 100, the panel member is able to be identified by virtue of an identification means such as user ID or a unique cookie assigned to the member during the sign up process. A cookie is a feature of the internet protocol Hypertext Transfer Protocol (HTTP), which is essentially a unique identifier stored on the user's computer.

During the processing of the data it is possible to check for any anomalous usage of sites (e.g. One user visiting a particular site fifty times in one day), that may not be representative of the overall sample of panellists. If it finds anomalies like this, the particular data may then be disregarded.

When recording interactions of a panel of users at the data collection and processing means 20, a view of internet usage by the "panel population" is able to be obtained. The data obtained via this panel approach may be used in isolation to obtain relevant statistics. Alternatively, as previously mentioned, a fusion of the panel data with site centric measurement data such as from browser based data or proxy or server logs may be used. In this alternative way, it is possible to fill the reporting properties or interactions of resources for which accurate site centric measurement data is not available, in order to improve the overall market measurement accuracy.

The user details should be periodically validated, so from time to time the users should be contacted to confirm participation and verify personal details.

Variations and additions are possible within the general inventive concept as will be apparent to those skilled in the art. In particular, if a user's browser or interface device does not support Java, alternative approaches for obtaining measurement data are possible and within the inventive concept, such as via CGI (Common Gateway Interface) measurement.

What we claim is:

1. A computer-implemented method of measuring and analysing multiple data sources over a communications network in order to ascertain information about use of one or more resources linked to said communications network, said method comprising:
    obtaining, by a server, site-centric data, wherein the site-centric data corresponds to a first group of one or more monitored resources;
    obtaining, by the server, user-centric data, wherein the user-centric data corresponds to a second group of one or more monitored resources;
    combining, by the server, the site-centric data and the user-centric data to form a single data source corresponding to usage information of one or more resources;
    processing, by the server, the site-centric data and the user-centric data to form a calibration value; and
    calibrating, by the server, an unmonitored resource value corresponding to one or more unmonitored resources based on the calibration value by multiplying the unmonitored resource value by the calibration value;
    wherein the processing to form a calibration value comprises:
    calculating a weighting factor based on a number of users that have interactions recorded in relation to the second group of one or more monitored resources and a total number of users expected to have access to the one or more resources available through the communications network; and
    multiplying the weighting factor with a number of users in the sample group that have interactions recorded in relation to the first group of one or more monitored resources to obtain a first figure for an expected number of all users to have interactions with the first group.

2. The computer-implemented method according to claim 1 comprising:
    forming, by the server, when the user-centric data is obtained with respect to a group of monitored users, a sample group of monitored users;
    recording, by the server, interactions of users in the sample group of monitored users; and
    measuring, by the server, the recorded interactions of the users in the sample group of monitored users.

3. The computer-implemented method according to claim 2, wherein the processing the site-centric data and the user-centric data to form the calibration value further includes:
    processing, by the server, the user-centric data in relation to the measured interactions of the users in the sample group of monitored users.

4. The computer-implemented method according to claim 1, wherein the combining the site-centric data and the user-centric data is accomplished via a reporting server connected to the communications network and includes at least one of:
    displaying, via the reporting server, the single data source,
    aggregating, via the reporting server, the single data source,
    transforming, via the reporting server, the single data source,
    calibrating, via the reporting server, the single data source, and
    formatting, via the reporting server, said single data source.

5. The computer-implemented method according to claim 1, further comprising:
    processing, by the server, the site-centric data and the user-centric data.

6. The computer-implemented method according to claim 1, wherein the obtaining the site-centric data includes:
    obtaining, via the server, measurements of interactions of all users of the first group of one or more monitored resources using a measurement code unit corresponding to the first group.

7. The computer-implemented method according to claim 1, wherein the obtaining the user-centric data includes:
    obtaining, by the server, a measurement code unit from the user interface of the users in the sample group; and
    recording, by the server, interactions of each user in the sample group based on the measurement code unit.

8. The computer-implemented method according to claim 1, further including:
    multiplying the weighting factor with a number of users in the sample group that have corresponding interactions recorded in relation to the one or more unmonitored resources to obtain a second figure for an expected number of all users to have recorded interactions with the one or more unmonitored resources.

9. The computer-implemented method according to claim 8, wherein the error rate is calculated by dividing a number of actual interactions in the site-centric data, pertaining to the one or more monitored resources in the first group, by the first figure.

10. The computer-implemented method according to claim 9, wherein the error rate is multiplied by the second figure to obtain an expected number of total users to have interactions in relation to the one or more unmonitored resources.

11. A non-transitory computer-readable medium having embedded thereon instructions executable by a processor, the instructions operable to cause a computer to execute a method, the method comprising:
    obtaining site-centric data, wherein the site-centric data corresponds to a first group of one or more monitored resources;
    obtaining user-centric data, wherein the user-centric data corresponds to a second group of one or more monitored resources;
    combining the site-centric data and the user-centric data to form a single data source corresponding to usage information of one or more resources;
    processing the site-centric data and the user-centric data to form a calibration value; and
    calibrating, by the server, an unmonitored resource value corresponding to one or more unmonitored resources based on the calibration value by multiplying the unmonitored resource value by the calibration value;
    wherein the processing to form a calibration value comprises:
    calculating a weighting factor based on a number of users that have interactions recorded in relation to the second group of one or more monitored resources and a total number of users expected to have access to the one or more resources available through the communications network; and multiplying the weighting factor with a number of users in the sample group that have interactions recorded in relation to the first group of one or more monitored resources to obtain a first figure for an expected number of all users to have interactions with the first group.

12. The computer-implemented method according to claim 11, further comprising:

forming, by the server, when the user-centric data is obtained with respect to a group of monitored users, a sample group of monitored users;

recording, by the server, interactions of users in the sample group of monitored users; and measuring, by the server, the recorded interactions of the users in the sample group of monitored users.

13. The computer-implemented method according to claim 11, wherein the processing the site-centric data and the user-centric data to form the calibration value further includes:

processing, by the server, the user-centric data in relation to the measured interactions of the users in the sample group of monitored users.

14. The computer-implemented method according to claim 11, further comprising:

processing, by the server, the site-centric data and the user-centric data.

15. The computer-implemented method according to claim 11, wherein the obtaining the site-centric data includes:

obtaining, via the server, measurements of interactions of all users of the first group of one or more monitored resources using a measurement code unit corresponding to the first group.

16. The computer-implemented method according to claim 11, wherein the obtaining the user-centric data includes:

obtaining, by the server, a measurement code unit from the user interface of the users in the sample group; and recording, by the server, interactions of each user in the sample group based on the measurement code unit.

17. The computer-implemented method according to claim 11, further including:

multiplying the weighting factor with a number of users in the sample group that have corresponding interactions recorded in relation to the one or more unmonitored resources to obtain a second figure for an expected number of all users to have recorded interactions with the one or more unmonitored resources.

18. The computer-implemented method according to claim 17, wherein the error rate is calculated by dividing a number of actual interactions in the site-centric data, pertaining to the one or more monitored resources in the first group, by the first figure.

* * * * *